United States Patent [19]

Gnagy et al.

[11] Patent Number: 5,119,535

[45] Date of Patent: Jun. 9, 1992

[54] METHOD OF RECONFIGURING RIGID AND SEMIRIGID STRUCTURES

[75] Inventors: Clayton C. Gnagy, Enumclaw; William L. Rodman, Kirkland; Ralph R. Welsh, Kent, all of Wash.

[73] Assignee: The Boeing Company, Seattle, Wash.

[21] Appl. No.: 408,693

[22] Filed: Sep. 18, 1989

[51] Int. Cl.[5] .............................................. B23P 15/04
[52] U.S. Cl. .................................... 29/469.5; 72/363; 72/364
[58] Field of Search ................. 72/363, 364; 29/469.5; 264/239

[56] References Cited

U.S. PATENT DOCUMENTS

| | | | |
|---|---|---|---|
| 2,370,956 | 3/1945 | Harkom | 144/281 |
| 2,433,806 | 12/1947 | Bardin | 72/363 |
| 2,563,394 | 8/1951 | Cadgene | 8/130.1 |
| 2,593,714 | 4/1952 | Robinson | 154/83 |
| 2,790,207 | 4/1957 | Steele et al. | 18/56 |
| 2,838,800 | 6/1958 | Hertz | 18/48 |
| 2,919,472 | 1/1960 | Steele | 18/47.5 |
| 2,964,852 | 12/1960 | Doleman et al. | 34/95 |
| 2,971,242 | 2/1961 | Doleman et al. | 26/60 |
| 3,033,734 | 5/1962 | Price | 156/305 |
| 3,052,021 | 9/1962 | Needham | 72/363 X |
| 3,064,345 | 11/1962 | Herman et al. | 29/421 |
| 3,072,968 | 1/1963 | Watson et al. | 18/53 |
| 3,222,911 | 12/1965 | Kirkpatrick et al. | 72/363 |
| 3,440,708 | 4/1969 | McGee et al. | 29/419 |
| 3,550,421 | 12/1970 | Stabel | 72/363 X |
| 3,794,705 | 2/1974 | Harley | 264/37 |
| 4,301,584 | 11/1981 | Dillner et al. | 72/363 X |

FOREIGN PATENT DOCUMENTS 753565  2/1967  Canada.

Primary Examiner—Timothy V. Eley
Attorney, Agent, or Firm—Joan H. Pauly

[57] ABSTRACT

A fluid such as a fluidized bed or a molten bath, is heated to a temperature sufficiently high to soften a substantially rigid body of material and sufficiently low to avoid damage to the material. While maintaining the fluid at this temperature, the body is immersed in the fluid to heat the body uniformly. Pressure is applied to the heated body to form it into a desired three-dimensional configuration. The heated body is removed from the fluid either before, after, and/or while the pressure is applied. The body is allowed to cool and harden into its desired configuration. The body is preferably formed between a flexible member and a mold surface. The method may be used to form various types of material, including honeycomb core, laminated sheets of plastic, plastic tubing, and titanium. The body may be precut and indexed and secured to a mold which is immersed in the fluid with the body.

27 Claims, 11 Drawing Sheets

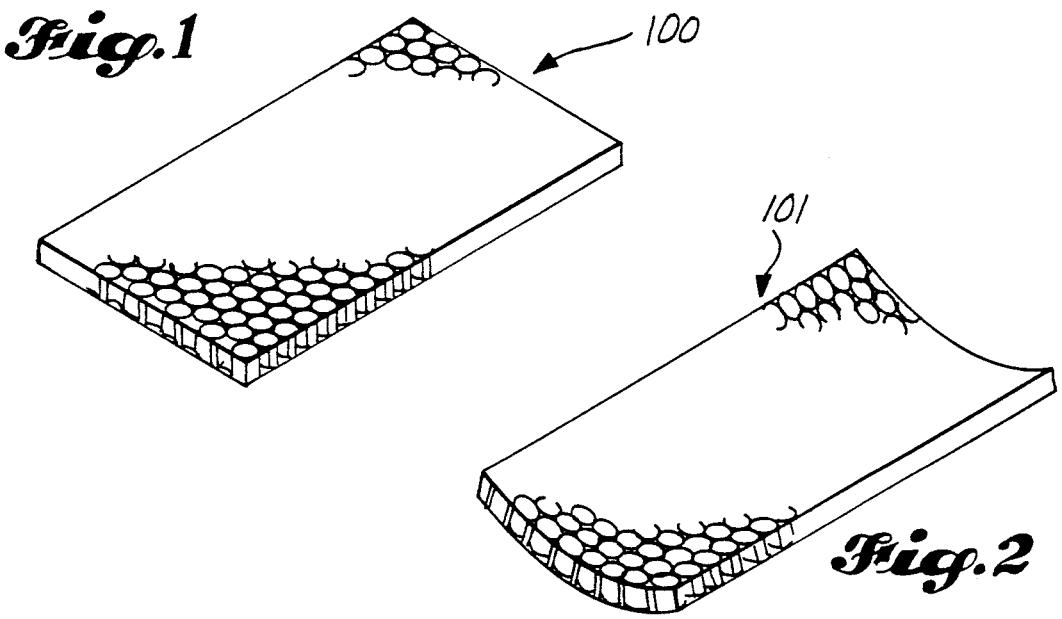
Fig.1
Fig.2
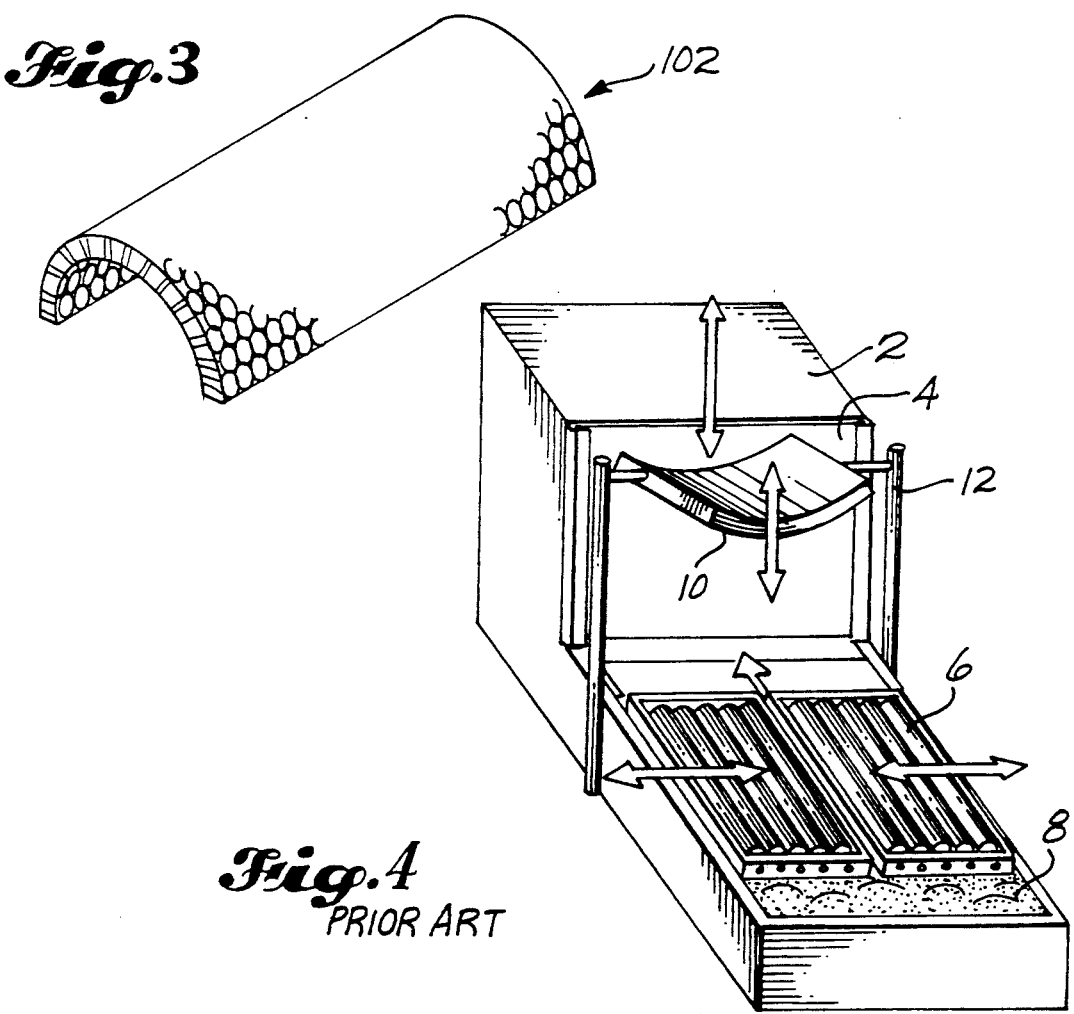
Fig.3
Fig.4
PRIOR ART

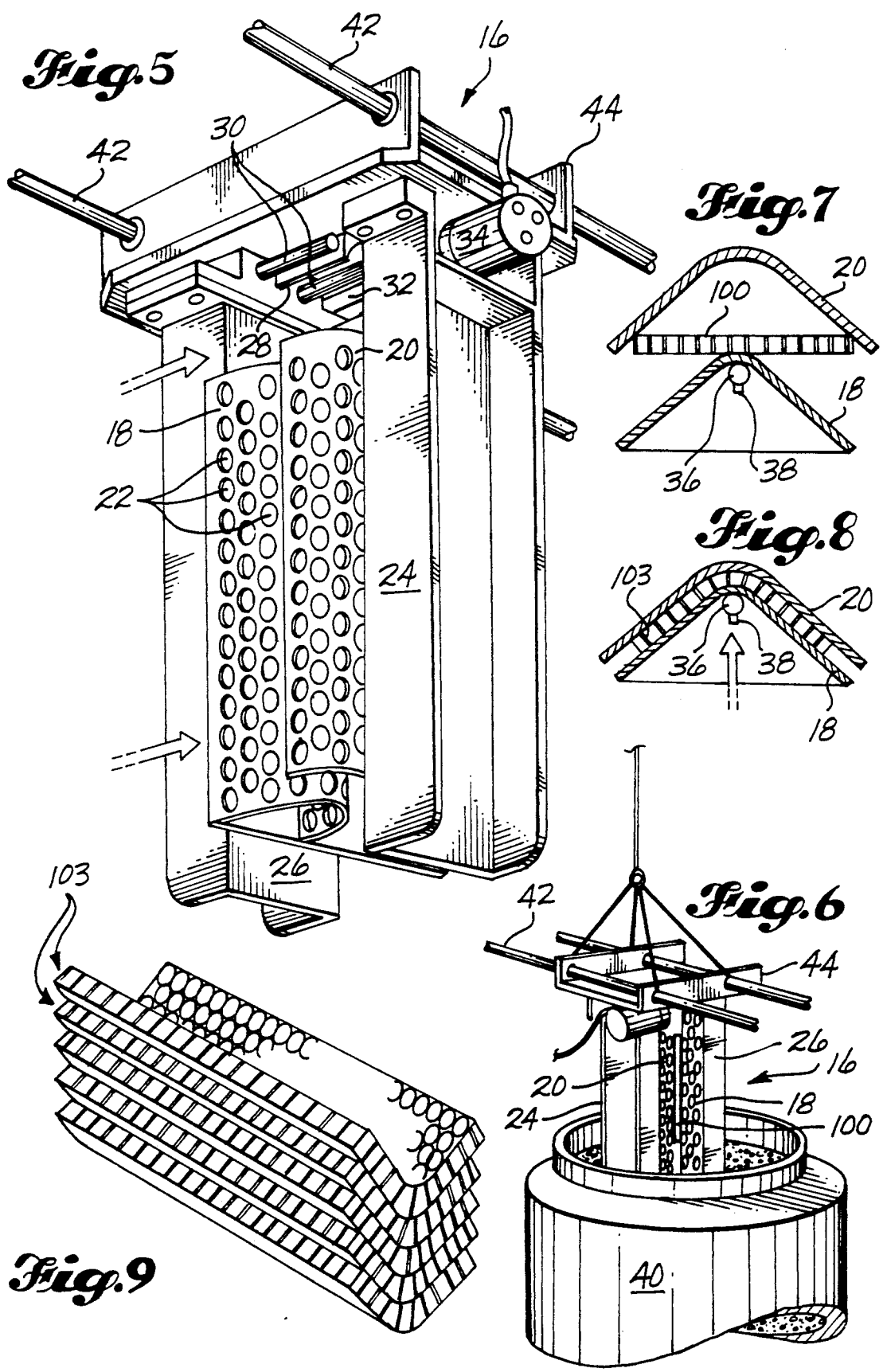

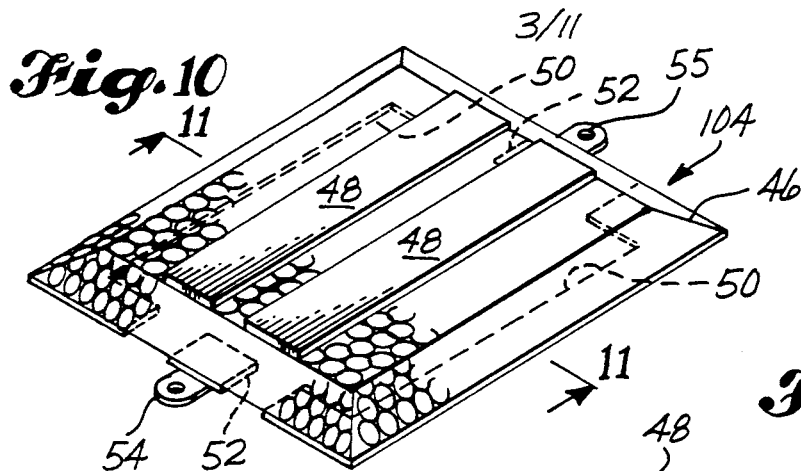
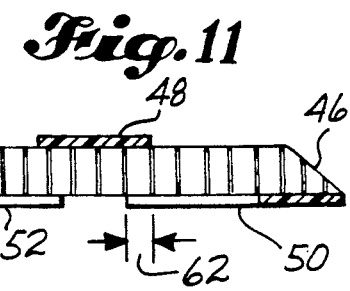
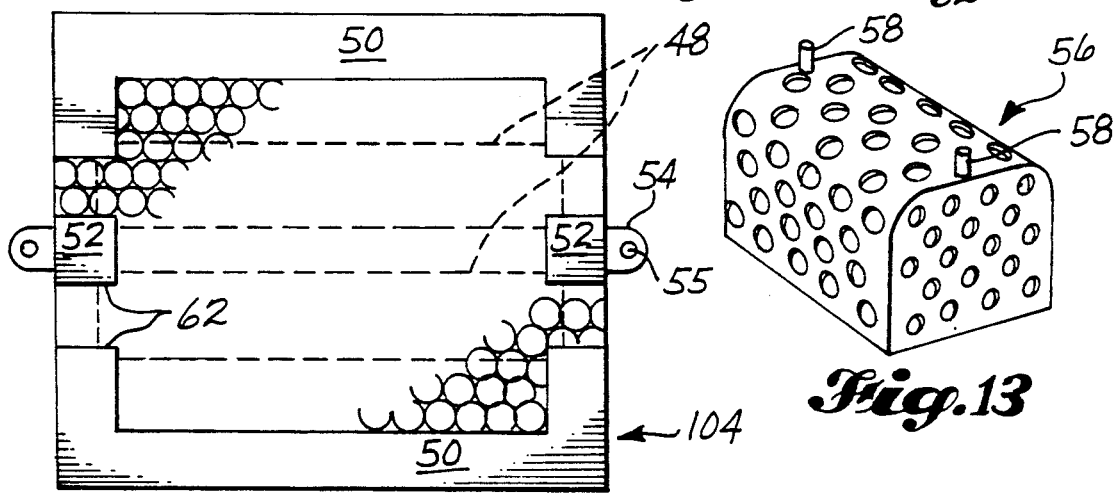
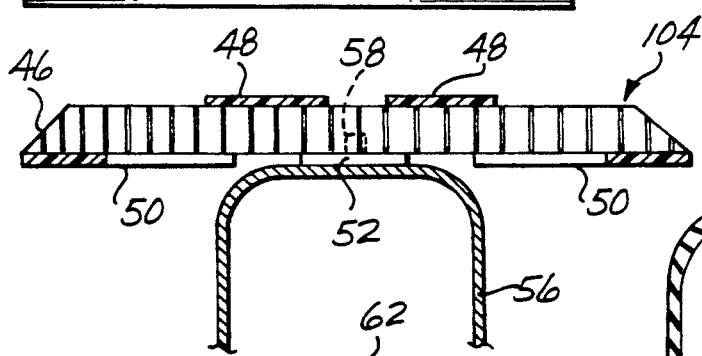
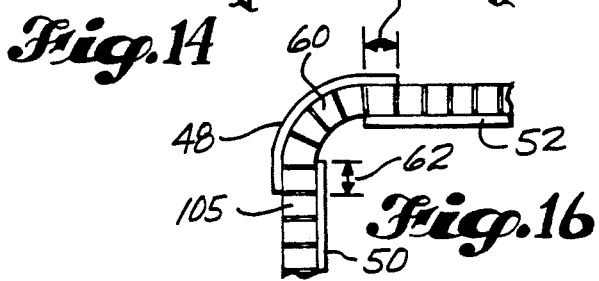
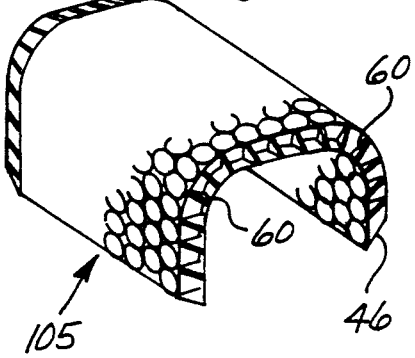

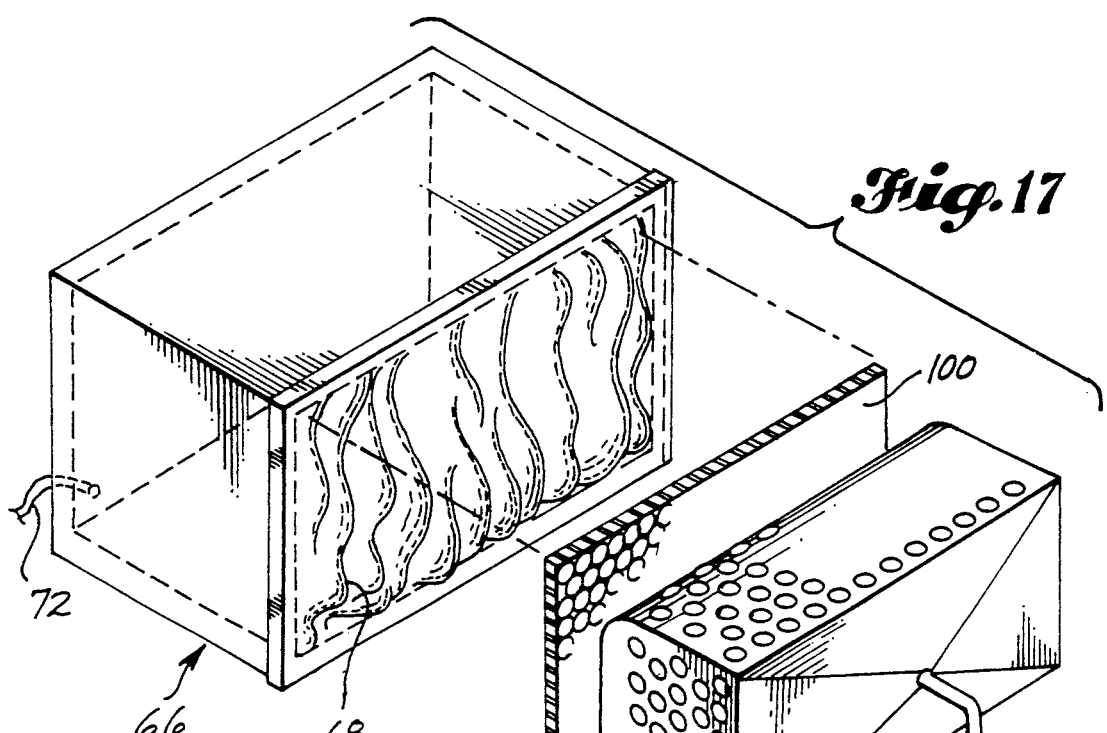
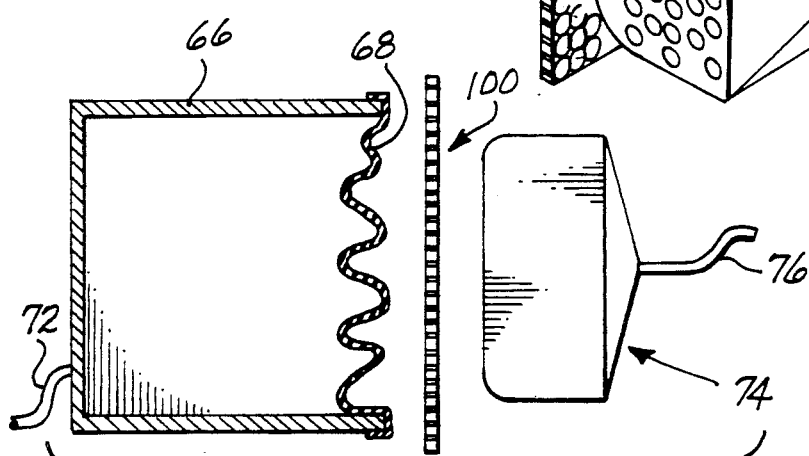
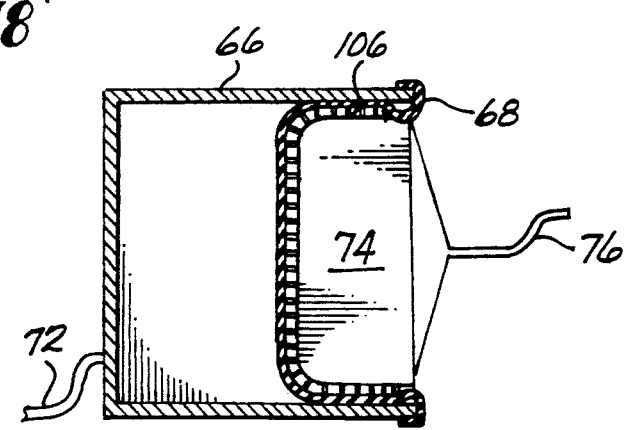

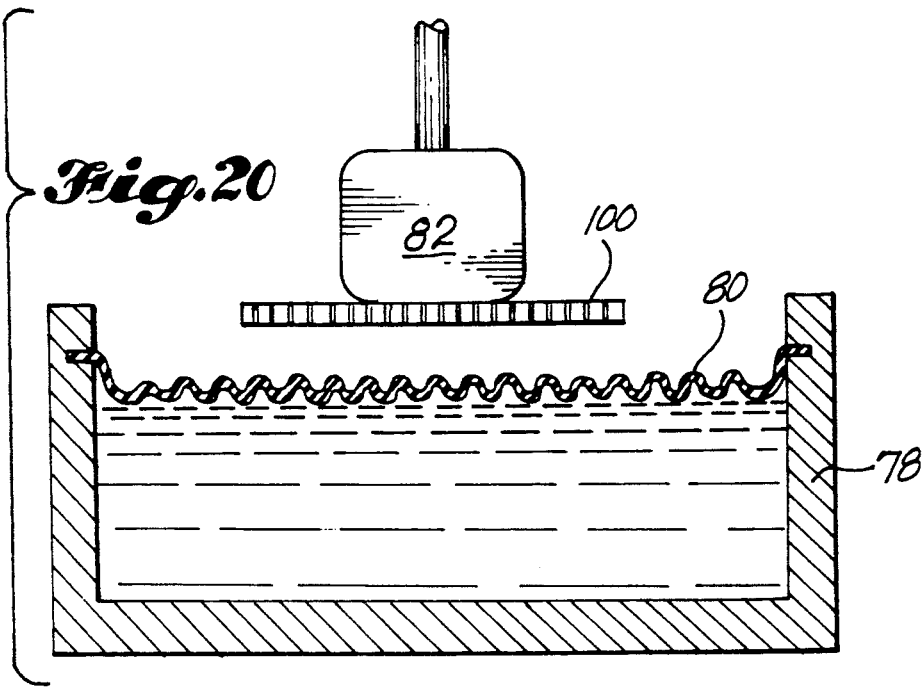
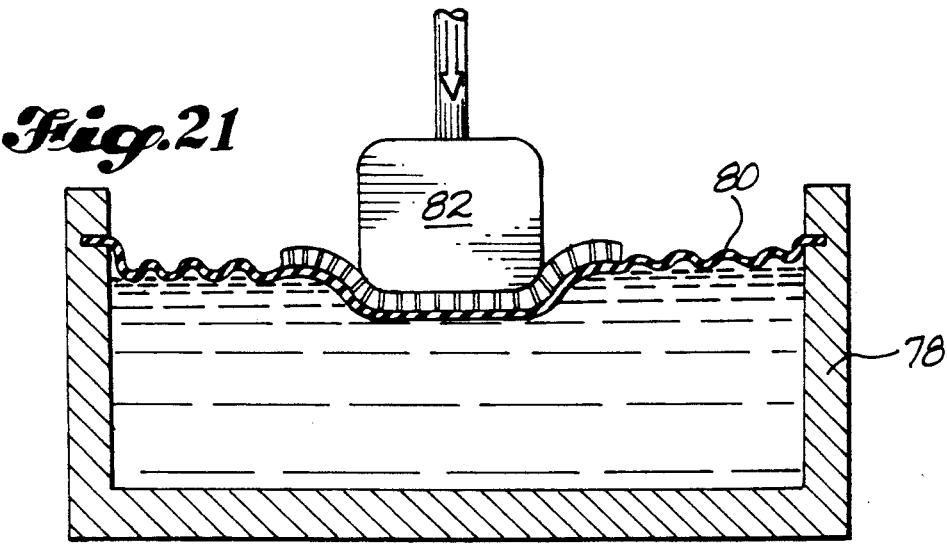
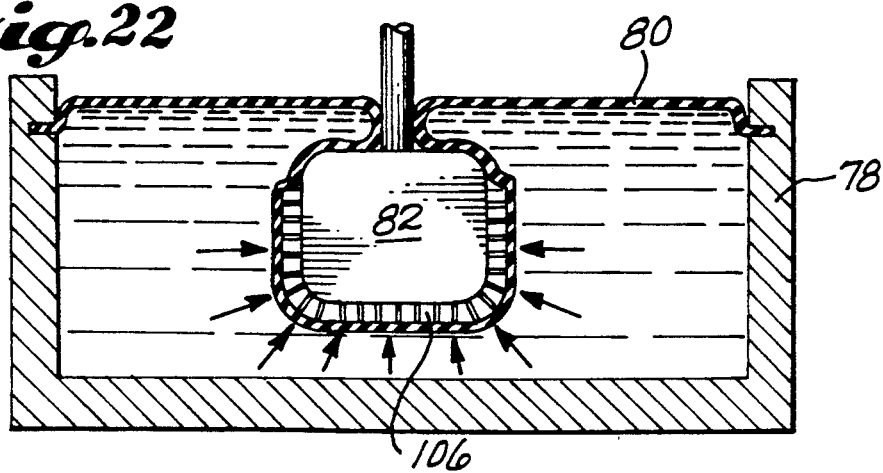

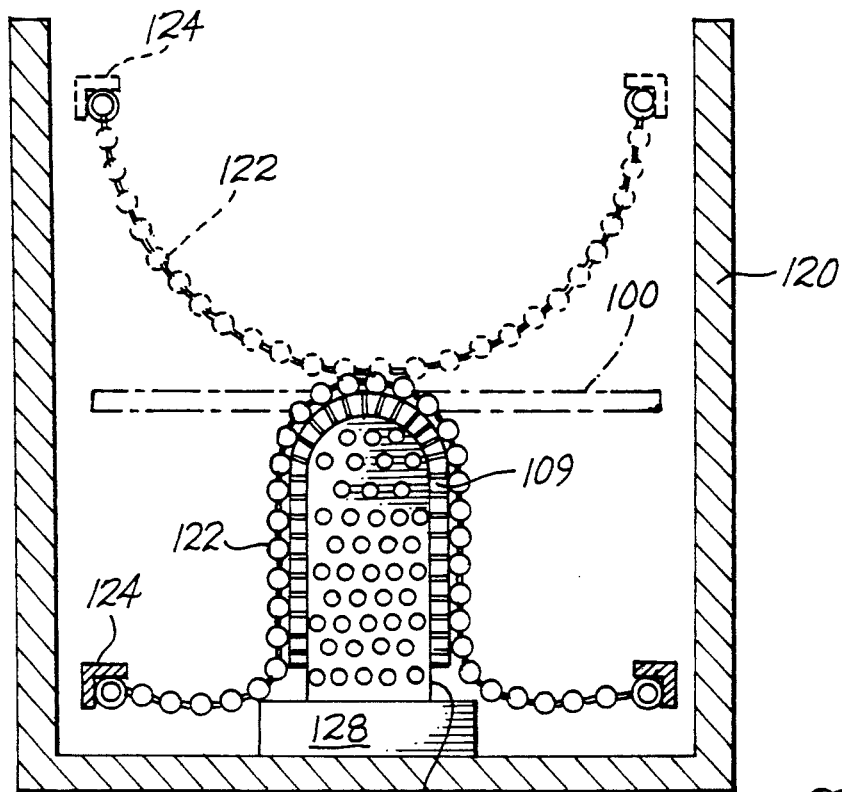
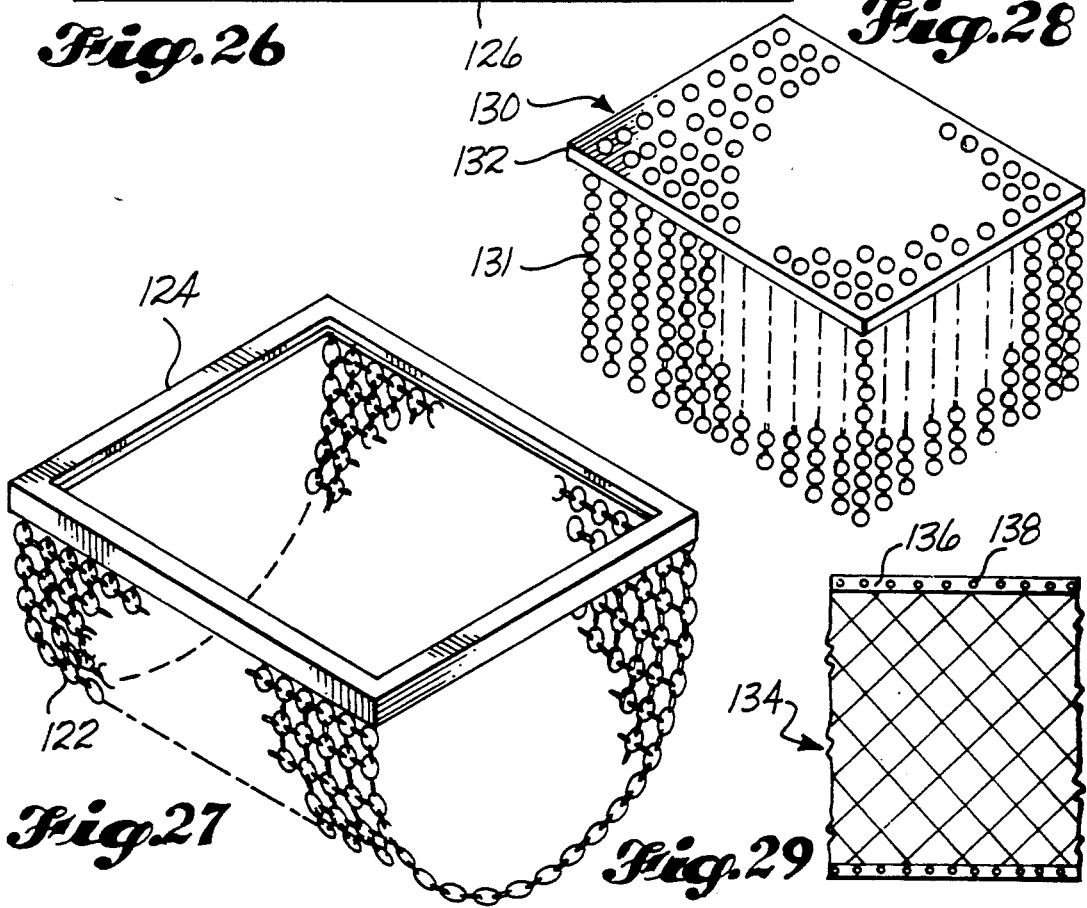

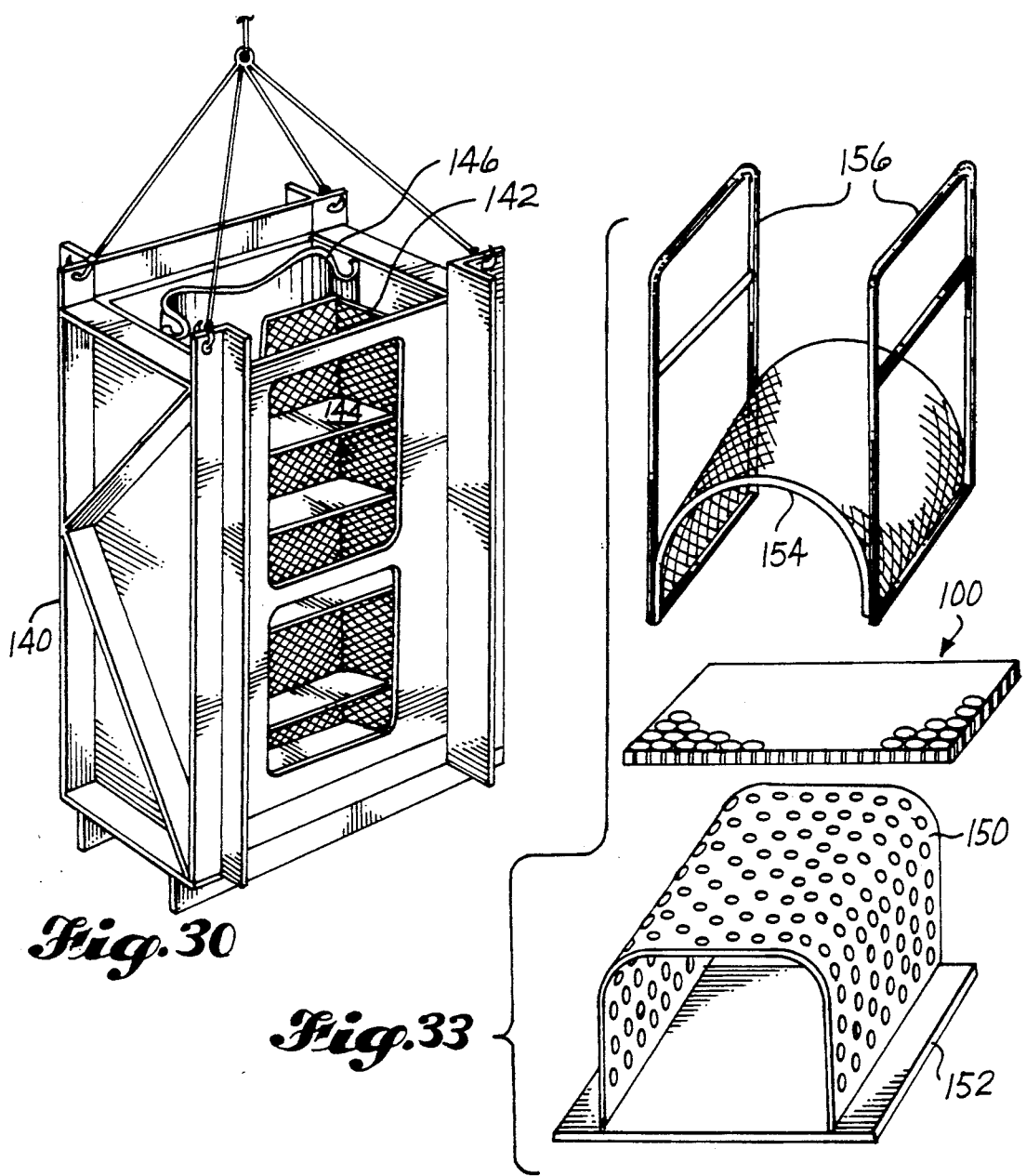
*Fig.30*
*Fig.33*
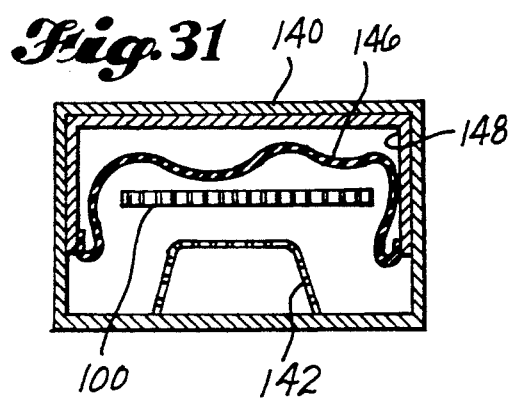
*Fig.31*
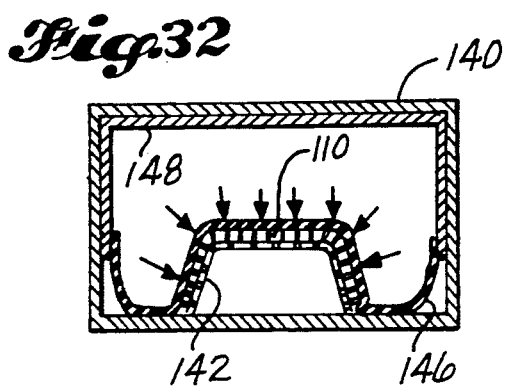
*Fig.32*

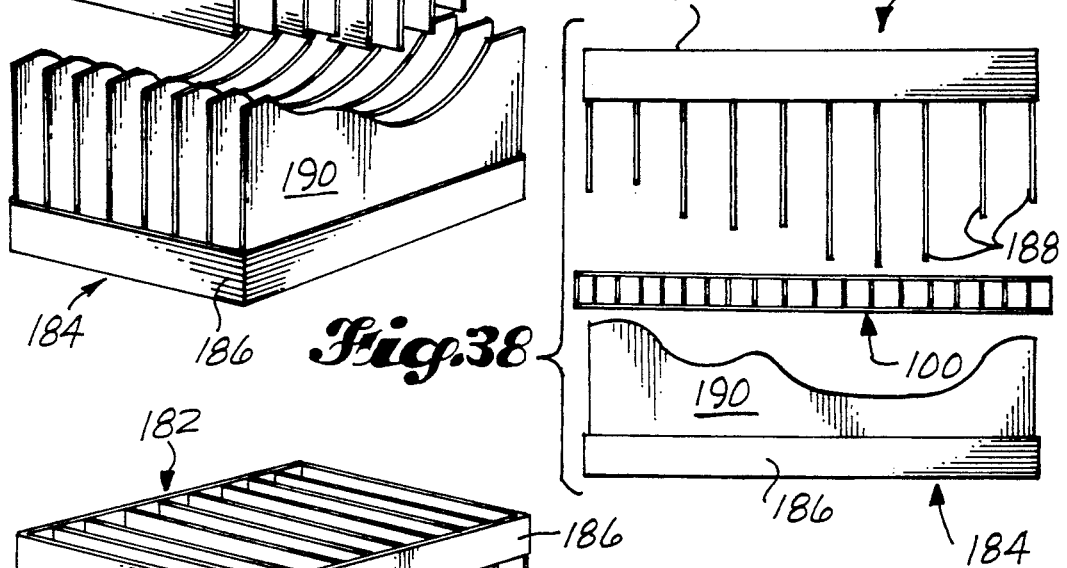
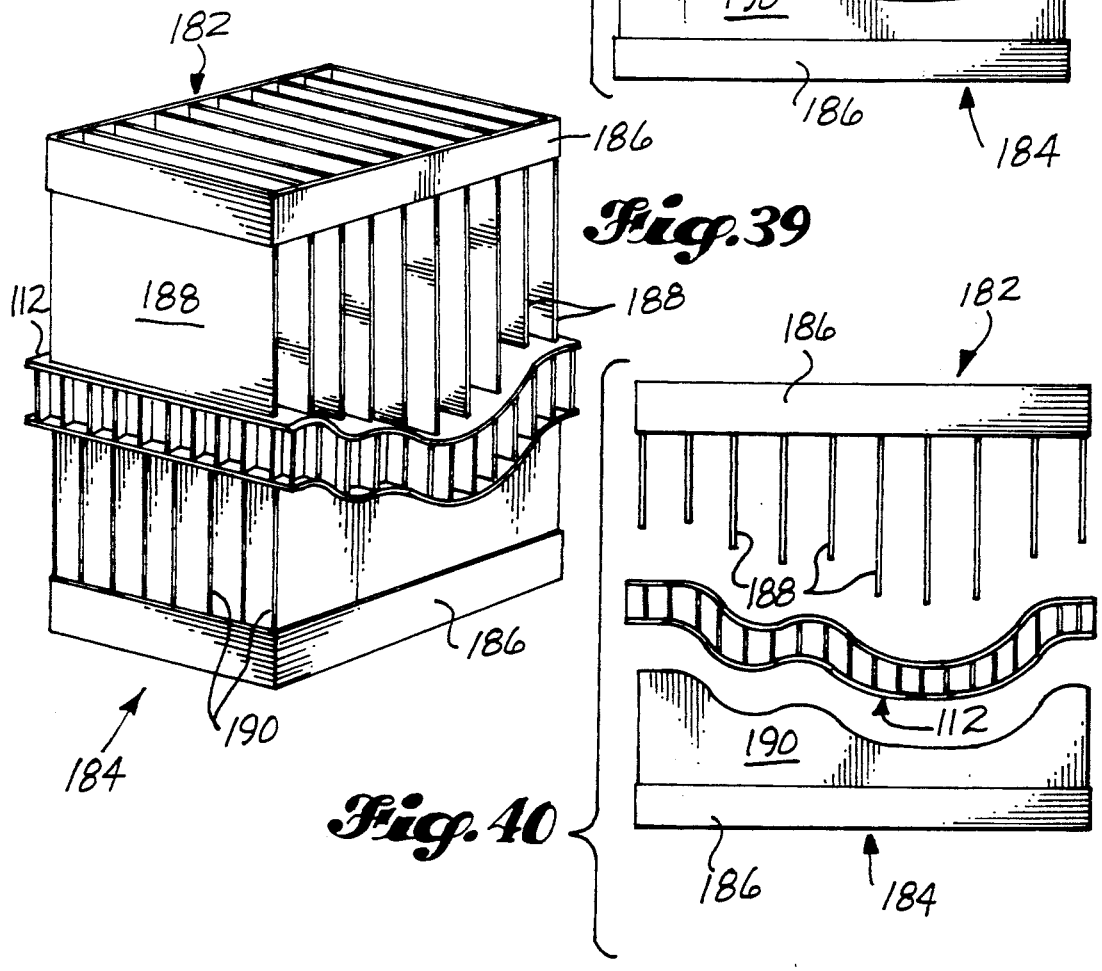

METHOD OF RECONFIGURING RIGID AND SEMIRIGID STRUCTURES

DESCRIPTION

1. Technical Field

This invention relates to methods of changing the three-dimensional configurations of structures and, more particularly, to such a method in which a substantially rigid body of material is immersed in a heated fluid to soften the material without damaging it, and the heated body is subjected to pressure to form it into a desired configuration and is allowed to cool and harden into such configuration.

2. Background Art

In the manufacture of aircraft, there is a frequent need to form various types of material into specific three-dimensional configurations. These configurations commonly have complex curvatures and/or relatively large degrees of curvature. The current standard method of forming a number of types of material is to heat the material in an oven or autoclave and then form it by urging a mold against it or using standard vacuum forming procedures. Types of material that are formed in this manner include honeycomb cores, composite material lay-ups or laminates, thermoplastic tubing, and titanium. A number of problems are associated with the forming of each of these types of materials.

Nonmetallic honeycomb core is normally made from glass fabric or Nomex (trademark) aramid fibers coated with a phenolic resin. Other types of fibers or fabrics and resins may also be used. The honeycomb core is received from the manufacturer in the form of expanded blocks which are subsequently cut to the required sheet thickness. The current procedure for forming a sheet of honeycomb core is to heat it in a hot air convection oven and then urge it against a mold outside the oven for a period of time sufficient to set the desired shape.

Because of the cellular configuration of the core, the nature of the materials from which it is made, and the inefficiency of convection heating, the core heats up relatively slowly and unevenly in the convection oven. The lengthy heat-up process results in relatively high labor costs. The uneven heating causes excessive heating of portions of the core when the core is heated sufficiently to soften it for forming. The excessive heating in turn causes scorching of the core materials, cell buckling, and cell node separation, all of which degrade the quality of the formed core. The quality is further degraded by the tendency of the formed core to spring back to its original shape. In a significant number of cases, the degradation is sufficient to necessitate rejection and discarding of the core. This wastes both labor and core material and, therefore, increases the cost of manufacturing the aircraft.

The difficulty in evenly heating the core also places significant constraints on the uses of the formed core. Even when the formed core has acceptable quality, it cannot generally be used in load-bearing applications because its strength is reduced by the charring and other degrading effects of convection heating Moreover, the final configurations which may be obtained are limited. For example, curved configurations are limited to relatively low degrees of curvature.

Lay-ups of a plurality of plies of fiber reinforced resin matrix composite materials are commonly formed directly onto a mold and then vacuum bagged and cured in an autoclave. This procedure has proved satisfactory for various types of parts, but is not suitable for very large parts, such as wing sections Such large scale structures are too large for vacuum bagging and do not fit into the autoclaves that are available at most installations. The large structures are also subject to buckling and wrinkling when the plies are laid onto a tool and are very difficult to heat evenly. The difficulty in obtaining even heating of large scale laminates also makes it impractical to form composite material and other thermoplastic sheet stock using the conventional method of heating in an oven that is currently employed to form honeycomb core. The uneven heating results in hard spots in the laminate where it is insufficiently heated. These hard spots in turn result in inaccurate forming. Other portions of the laminate are excessively heated and, thus, are damaged by charring, blistering, burning, and cracking Another type of material with similar forming problems is thermoplastic tubing. Such tubing is formed, for example, to create bends in the tubing and/or to expand or flare an outer end of a section of tubing. The conventional method for forming bends is to heat the tubing in an oven and then draw it across a tool to progressively form the bend. Like honeycomb core and large sections of sheet laminate, the tubing is very difficult to heat evenly in an oven. The uneven heating results in inaccurate forming and damage to the tubing. The type of damage that may occur includes charring, burning, blistering, cracking, and melting.

The forming of titanium also presents a number of problems. Titanium is difficult and time consuming to machine. Therefore, in many situations it is desirable to form titanium by softening it and then molding it. This approach is presently carried out by heating a titanium body in an oven and then pressure forming it. The degree of forming which may be accomplished in this manner is severely limited because of the difficulty in heating all portions of the titanium body evenly and the very narrow temperature range in which the titanium is plastic, i.e. soft enough to be formed but not so hot that it begins to melt. The melting of portions of a titanium body and/or insufficient softening of other portions of the body result in inaccurately or incompletely formed final configurations. Uneven heating can also lead to oxidation of the metal.

Methods of treating plastic sheet material in molten metal baths are disclosed in U.S. Pat. No. 2,563,394, granted Aug. 7, 1951, to J. Cadgene; and U.S. Pat. No. 2,838,800, granted Jun. 17, 1958, to D. B. Hertz. The Cadgene patent has a stated purpose of improving the dimensional stability of thermoplastic fabrics so that they retain their original shape. To accomplish this, a length of fabric is continuously moved through a molten metal bath between support rollers and a guiding roller. The temperature of the bath is sufficient to slightly plasticize the fabric but insufficient to melt it. The fabric is subjected to transverse and longitudinal tension during the processing. Because of the slightly plasticized state of the fabric, it is embossed when it is pulled around a roller with an embossed surface. Alternatively, the roller has a smooth surface to cause the slightly plasticized yarns to adhere to each other and thereby become permanently connected.

In the Hertz process, organic plastic sheet material is similarly drawn around rollers in a molten metal bath. The temperature of the bath is sufficient to soften the thermoplastic material but is below the melting point of the material. This permits deformation of the surface of the material while maintaining it in sheet form. The material is immersed to a sufficient depth so that there is equal hydrostatic pressure on all portions of the surface regardless of variations in the gauge of the sheet material. The rollers may be embossed to emboss the surface of the sheet or smooth to polish the surface.

Methods of expanding unexpanded honeycomb to form the cells of a honeycomb core are disclosed in U.S. Pat. No. 2,790,207, granted Apr. 30, 1957, to R. C. Steele et al.; and U.S. Pat. No. 2,919,472, granted Jan. 5, 1960, to R. C. Steele. In the Steele et al. method, one end of the unformed cells in thermoplastic resin impregnated honeycomb is closed, and the opposite end is subjected to fluid pressure to expand the cells. The impregnated material may be preheated or may be heated by heating the fluid. In the Steele method, core material in an uncured intermediate state is progressively doused or hosed with heated water to expand the cells. U.S. Pat. No. 3,033,734, granted May 8, 1962, to F. P. Price., discloses a method of making honeycomb structures by positioning core and facing material and immersing them in solvent to make them tacky to cause them to adhere to each other without heat and pressure.

Processes for vulcanizing rubber and similar materials a fluidized bed are disclosed in U.S. Pat. No. 3,072,968, granted Jan. 15, 1963, to W. F. Watson et al; and U.S. Pat. No. 3,794,705, granted Feb. 26, 1974, to R. E. Harley; and in Canadian Pat. No. 753,565, granted Feb. 28, 1967. Watson et al. state that their process vulcanizes quickly and easily because of efficient transfer of heat. Treatment of textile fabrics in fluidized beds is disclosed in U.S. Pat. No. 2,964,852, granted Dec. 20, 1960, to J. Doleman et al.; and U.S. Pat. No. 2,971,242, granted Feb. 14, 1961, to J. Doleman et al. A method in which laminated structures are bonded in a bed of sand into which heated air is injected is disclosed in U.S. Pat. No. 2,370,956, granted Mar. 6, 1945, to J. F. Harkom.

A method of making cellular structures is disclosed in U.S. Pat. No. 2,593,714, granted Apr. 22, 1952, to R. H. Robinson. Materials such as impregnated fabric are formed by applying fluid pressure inside tubular portions of the material and confining the assembly within a mold.

The above patents and the prior art discussed and/or cited therein should be carefully considered for the purpose of putting the present invention into proper perspective relative to the prior art.

DISCLOSURE OF THE INVENTION

The subject of the invention is a method of changing the three-dimensional configuration of a substantially rigid body of material. According to an aspect of the invention, the method comprises heating a fluid to a temperature sufficiently high to soften the material and sufficiently low to avoid damage to the material. While the fluid is maintained at this temperature, the body is immersed in the fluid to heat the body uniformly. Pressure is applied to the heated body to form it into a desired three-dimensional configuration. The heated body is removed from the fluid. The body is allowed to cool and harden into the desired configuration.

As used herein, the term "fluid" means a liquid or fluidized solid particles in a fluidized bed. The term does not include purely gaseous mediums The method of the invention is preferably carried out using a fluidized bed or a molten bath. The bath may contain, for example, a molten metal alloy or molten eutectic salts.

The step of applying pressure may be carried out while the body of material is immersed in the .fluid, as the heated body is being removed from the fluid, and/or following removal of the heated body from the fluid. A preferred way of applying the pressure comprises moving a flexible member and a mold surface relative to each other to urge the body against the mold surface.

The three-dimensional configurations of substantially rigid bodies of various types of material may be changed using the method of the invention. For example, consistent with the invention, the body may comprise plastic tubing, a sheet of plastic, or a honeycomb structure. The method may also be used to form bodies of titanium or titanium-containing alloys. In such case, the fluid is heated to a temperature that is less than the melting point of the titanium. This avoids melting of the titanium which, in the context of the invention, is regarded as damage to the titanium.

As used herein, a "substantially rigid body" means a body having a substantially self-supporting three-dimensional configuration; i.e., the body will exactly conform to a surface on which it is laid if the surface corresponds to its three-dimensional configuration but will not exactly conform to a noncorresponding surface, although it may drape or flex to some degree. For example, a flat sheet of lightweight honeycomb core is somewhat flexible but will not exactly conform to a curved surface.

A preferred feature of the invention is the additional step of indexing and securing the body on a mold before immersing the body. The mold and the secured body are immersed. When the pressure is applied, it forms the secured body against the mold. A preferred means of accomplishing this is to move the mold and a flexible member relative to each other. The forming of the body against the mold is preferably carried out after removing the mold and the secured body from the fluid.

The feature of indexing and securing the body on a mold has the advantages of simplifying the steps of immersing the body and applying pressure to form the body, and of avoiding having to position the softened heated body relative to a mold. The positioning of the body by indexing and securing it on the mold while the body is still in its substantially rigid state is relatively easy to carry out and provides great flexibility in the manner in which the pressure is applied to form the body. If the body is formed while it is immersed in the fluid, the complication of positioning the body relative to the mold in the fluid is avoided. If the body is formed after removing it from the fluid, none of the limited time available before the body hardens is consumed in positioning the body relative to the mold prior to the application of pressure.

Another preferred feature of the invention is, before immersing the body, cutting the body into a shape that will result in a substantially final configuration when the pressure is applied. The "cutting" may be accomplished by cutting with a sharp edge, grinding, sanding, machining, and/or similar operations that remove excess material. This feature is especially advantageous when the configuration of a honeycomb structure is being changed. In the current method of forming honeycomb core material into a three-dimensional configuration, the flat stock of honeycomb core is rough cut using a known type of five-axis cutting machine. The rough cut core is then heated in an oven and formed against a mold. The final cutting of the formed core material, including chamfering edge portions of the material, is done by hand using highly labor and time intensive procedures. The feature of the invention of cutting the flat stock honeycomb core to substantially its final size before forming the core eliminates most, if not all, of the final handworking and shaping. Preferably, the cutting before the body is immersed includes chamfering edge portions of the honeycomb structure. This can easily be accomplished using the automatic five-axis machine when the core is still in a flat state. When combined with the preferred feature of indexing and securing the body before immersing, the feature of precutting the honeycomb structure results in highly accurate forming of the honeycomb structure with virtually no need for any cutting by hand.

An additional preferred feature relating to the configuring of honeycomb structures is the attaching of strips of stiffening material to the honeycomb structure before immersing it. A first strip of stiffening material is attached to a first surface of the honeycomb structure. Two spaced strips of stiffening material are attached to a second surface of the structure opposite the first surface. These two strips are positioned to overlap opposite edge portions of the first strip. The pressure is applied to bend the structure along the first strip to form an outer radius along the first strip and an inner radius between the two spaced strips. The stiffening material may comprise, for example, film adhesive.

The strips of stiffening material maintain the dimensional stability of the structure in radius areas of the final configuration. The areas of overlap of the strips on the opposite surfaces of the structure create rigid areas that will not deform. The first strip along which the outer radius is formed maintains the arc length constant along the radius to thereby maintain the dimensioning of the outer surface and prevent damage, such as cell node separation, along the outer radius. The positioning and overlapping of the strips also help to maintain a constant thickness of the honeycomb structure in the area of the radius and adjacent areas.

The feature of stiffening strips is preferably used in combination with the features of precutting the structure and indexing and securing it before immersing it. The stiffening strips help to maintain the indexing when pressure is applied to form the structure. The overall result of the combination of these preferred features is a high quality accurately formed part achieved while, at the same time, accomplishing great savings in time and labor.

The method of the invention provides an efficient and cost effective means of solving the problems discussed above in connection with known methods for reconfiguring rigid and semirigid structures. In the method of the invention, heat is efficiently transferred to the workpiece body to cut down long heat-up time and to avoid the problems that have been associated with uneven heating. The inaccurate forming and various types of damage associated with uneven heating are eliminated. In addition, the rapid heating of workpieces including uncured or intermediate stage resins (prepregs) ensures that the resins do not cure before the workpiece is formed. The method of the invention also makes it possible to form various types of material into configurations which previously could not be obtained using molding procedures. The tendency of materials, such as honeycomb core, to spring back to their original shape is also eliminated or greatly reduced. The elimination of damage to the material and spring-back leads to a higher quality finished part and cost savings because of a great reduction in the number of rejections. The improved quality of formed honeycomb core makes it practical to use such core materials in load-bearing situations for which core formed by current methods has insufficient strength. The potential for load-bearing applications is enhanced by the ease with which very dense core materials can be formed in accordance with the invention. Such dense core material is especially difficult to form using known methods.

By use of the invention, honeycomb core can be formed into more complex configurations and to have much higher degrees of curvature than has previously been possible. Sheet-like structures, such as sheet stock metal and integrated structures made up of plies of fiber reinforced resin matrix composite materials, can be formed on a much larger scale than has previously been practical. In addition, forming titanium into configurations which were previously achievable only by machining may readily be accomplished by the method of the invention. The use of the method of the invention to configure various types of material employed in the manufacture of aircraft has the potential of providing significant labor and cost savings and significantly increased versatility in the design of components. The method of the invention is highly reliable, versatile, and cost effective.

These and other advantages and features will become apparent from the detailed descriptions of the best modes for carrying out the invention that follows.

BRIEF DESCRIPTION OF THE DRAWINGS

In the drawings, like element designations refer to like parts throughout, and:

FIG. 1 is a pictorial view of a flat unformed piece of honeycomb core.

FIG. 2 is like FIG. 1 except that it shows the core formed into a configuration with a low degree of curvature.

FIG. 3 is like FIG. 2 except that it shows the core formed into a configuration with a higher degree of curvature.

FIG. 4 is a pictorial view of apparatus currently used to heat and mold honeycomb core.

FIG. 5 is a pictorial view of an embodiment of apparatus used for forming honeycomb core in accordance with the method of the invention.

FIG. 6 is a pictorial view of the apparatus shown in FIG. 5 and attached honeycomb core being lowered into a heated fluidized bed.

FIG. 7 is a cross-sectional view of the apparatus and core shown in FIG. 6.

FIG. 8 is like FIG. 7 except that it shows the apparatus and core after the core has been formed.

FIG. 9 shows a plurality of formed core sections nested together

FIG. 10 is a pictorial view of a section of honeycomb core which has been precut and to which stiffening strips have been attached in accordance with a preferred embodiment of the invention.

FIG. 11 is a sectional view taken along the line 11—11 in FIG. 10.

FIG. 12 is bottom plan view of the core section shown in FIGS. 10 and 11.

FIG. 13 is a pictorial view of a mold for forming the honeycomb shown in FIGS. 10-12.

FIG. 14 is a vertical sectional view of the core section shown in FIGS. 10–12 indexed and secured on the mold shown in FIG. 13.

FIG. 15 is a pictorial view of the core shown in FIG. 14 after it has been formed against the mold.

FIG. 16 is a fragmentary end view of the molded core shown in FIG. 15 with the stiffening strips attached.

FIG. 17 is a pictorial view of a preferred embodiment of apparatus for forming honeycomb core against a mold following removal from the heating fluid.

FIG. 18 is a side elevational view of the apparatus shown in FIG. 17 with the sides of the box and the side edges of the membranes removed for purposes of illustration.

FIG. 19 is like FIG. 18 except that it shows the forming of a honeycomb section near completion.

FIG. 20 is a vertical sectional view of another embodiment of apparatus for forming honeycomb core following removal from the heating fluid.

FIG. 21 is like FIG. 20 except that it shows the initial stages of the forming procedure.

FIG. 22 is like FIG. 21 except that it shows the final stage of the forming procedure.

FIG. 26 is a vertical sectional view, with portions shown in elevation, illustrating another embodiment of forming apparatus.

FIG. 27 is a pictorial view of the chain mat shown in FIG. 26.

FIG. 28 is a pictorial view of an alternative chain forming device.

FIG. 29 is a plan view of a portion of a forming quilted blanket.

FIG. 30 is a pictorial view of another embodiment of immersing and forming apparatus.

FIGS. 31 and 32 are cross-sectional views of the apparatus shown in FIG. 30 at the beginning and the end of the forming process, respectively.

FIG. 33 is a pictorial view of another embodiment of forming apparatus.

FIGS. 37 and 39 are pictorial views, and FIGS. 38 and 40 are elevational views, illustrating another embodiment of forming apparatus.

BEST MODES FOR CARRYING OUT THE INVENTION

Figure 34:
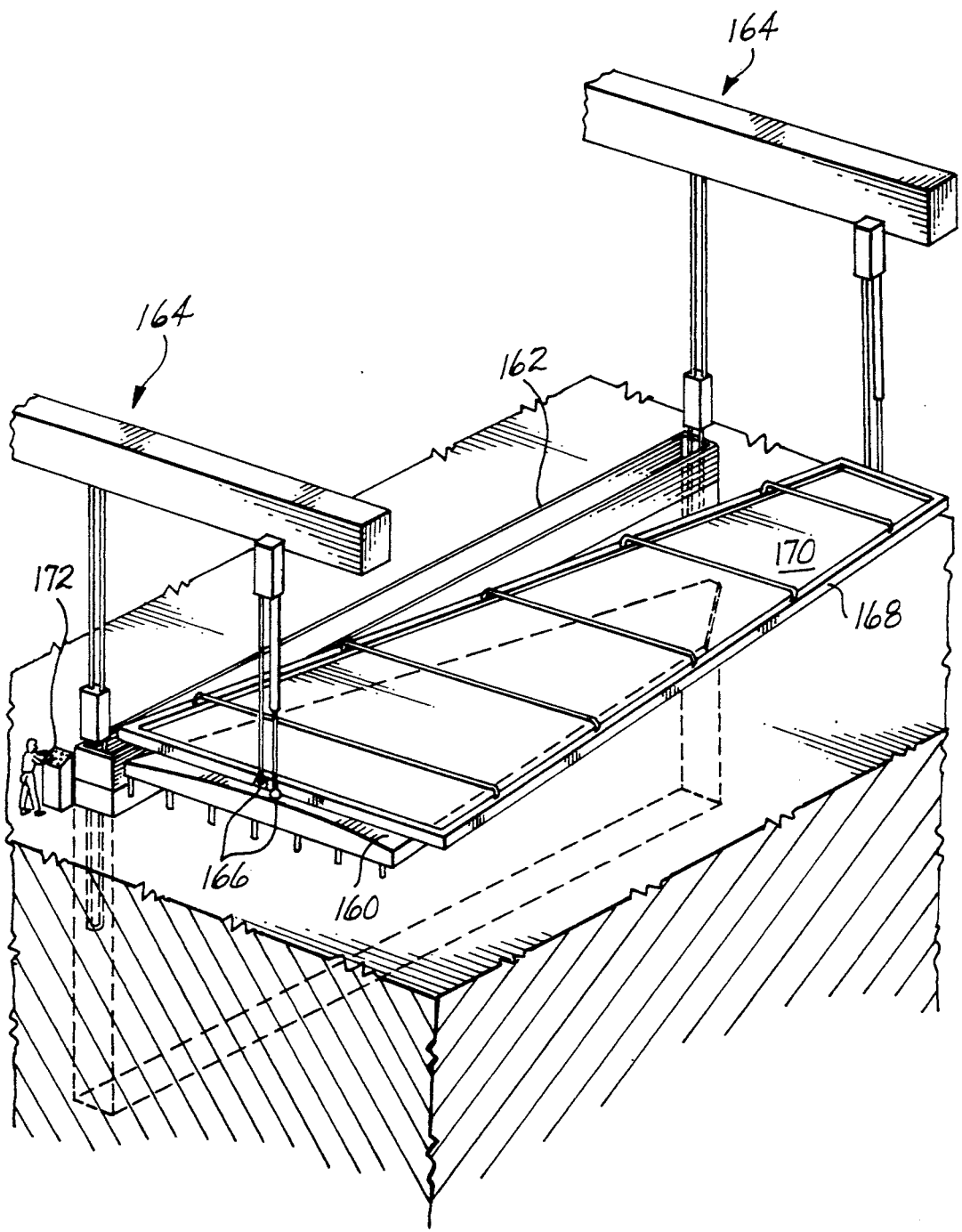
FIG. 34 is a pictorial view of an installation for immersing and forming large scale sheet material in accordance with the invention.
Figure 35:
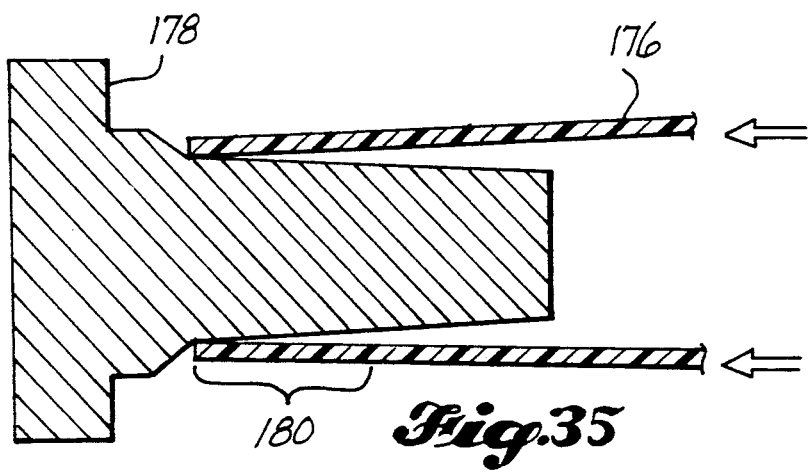
FIGS. 35 and 36 are sectional views illustrating the forming of an end portion of tubing.
Figure 36:
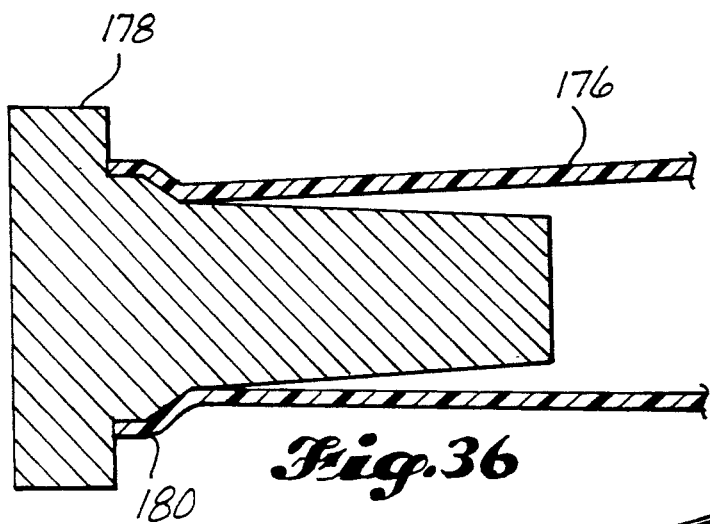

The drawings illustrate the best modes for carrying out the invention currently known to the applicants. In the drawings, various types of apparatus for practicing the method of the invention are shown, and most of the drawing figures illustrate the forming of honeycomb core material. It is currently anticipated that a primary application of the method of the invention will be in the forming of honeycomb core material and that the invention will be practiced using apparatus of the types shown in the drawings. However, it is of course to be understood that other types of apparatus could be used to advantage in practicing the method of the invention and that the method of the invention may be used to form a variety of types of material. For example, FIG. 34 illustrates the forming of large scale sheet material, and FIGS. 35 and 36 illustrate the forming of the end of a section of tubing.

FIG. 1 shows a flat sheet 100 of honeycomb core material which has been cut to a desired thickness from a stock block of core material. FIG. 2 illustrates a similar sheet 101 of honeycomb core material which has been formed to have a three-dimensional configuration with a relatively low degree of curvature. FIG. 3 illustrates a third sheet 102 of honeycomb core material which has been formed in accordance with the invention into a three-dimensional configuration with a relatively high degree of curvature. FIG. 4 illustrates a prior art method for forming honeycomb core material which has been in common use for a number of years. The configuration shown in FIG. 2 is obtainable using either the prior art procedure or the method of the invention. The prior art procedure is not adequate to form core material into the type of configuration shown in FIG. 3.

Referring to FIG. 4, the prior art apparatus includes a convection heating oven 2 with a door 4 which slides upwardly to permit materials to be placed in and removed from the oven 2. A foam bed 8 is positioned in front of and below the door 4. A shuttle 6 is shown positioned above the foam bed 8. The shuttle 6 includes a plurality of rollers oriented perpendicularly to the door 4. A mold 10 is mounted on a support frame 12 and is shown in its nonuse raised position spaced above the shuttle 6 and foam bed 8. In the practice of the prior art procedure, a flat sheet of honeycomb core is placed on the shuttle 6 with the shuttle 6 in the position illustrated. The oven door 4 opens, the shuttle 6 with the core thereon moves into the oven 2, and the door 4 closes. When the core has been heated for a predetermined amount of time, the door 4 opens and the shuttle 6 with the heated core thereon moves back to the position shown in FIG. 4. Then, the two lateral halves of the shuttle 6 move laterally outwardly, as indicated by the arrows in FIG. 4. This allows the honeycomb core to drop down onto the foam bed 8. The mold 10 is lowered against the core to form the core against the foam bed 8. The mold 10 is maintained in its lowered forming position to allow the core to harden into its new configuration.

The invention provides a method of changing the three-dimensional configuration of substantially rigid bodies of various types of material. In the method of the invention, a fluid is heated to a temperature sufficiently high to soften the material and sufficiently low to avoid damage to the material. While the fluid is maintained at this temperature, the body is immersed in the fluid to heat the body uniformly. Pressure is applied to the heated body to form it into a desired three-dimensional configuration. The heated body is removed from the fluid before, after, and/or as the body is removed from the fluid. Following the application of pressure and removal of the body from the fluid, the body is allowed to cool and harden into its desired configuration.

The nature of the heated fluid may vary without departing from the scope of the invention. Various types of non-contaminating liquids and fluidized beds are acceptable for use in practicing the method of the invention. To date, tests indicate that a fluidized bed of sand of a known type is most suitable. Such beds have produced high quality results in preliminary tests and have not presented any problems of buoyancy or contamination of the body of material. An immersion fluid of a mixture of the alloys sold under the trademarks Cerrocast and Cerrotru has also been tested in the forming of honeycomb core. Immediate even heating and lack of damage to the material, spring back, and oxidation of the resin coating was observed. However, there was residual adherence of the alloy to the honeycomb fibers. This indicates that these particular alloys may not be suitable for forming honeycomb core. Molten baths of other types of alloys and/or eutectic salts may, however, avoid the problem of residual adherence.

Fluidized beds of particles, such as sand, have the additional advantage of facilitating the forming of honeycomb core material outside of the bed. The core material may be immersed and removed vertically to retain the heated sand in the cells of the core material. The sand then acts to maintain the internal temperature of the core material while it is being transported to the pressure applying apparatus. Before the actual application of pressure, the core need only be tipped into a horizontal position to remove the sand. The ability to easily maintain the internal core temperature after the honeycomb core is removed from the bed greatly increases flexibility in the choice of the type and location of the pressure applying apparatus. Such apparatus may also be relatively simple since the complications of forming the material within the fluidized bed are avoided.

FIGS. 5-8 illustrate immersion and forming tooling 16 which has been built and tested for forming honeycomb core 100 in accordance with the invention. The tooling 16 includes a male mold half 18 and a female mold half 20. Each of the mold halves 18, 20 is made from perforated sheet steel and has a multiplicity of holes 22 extending therethrough. As shown, the mold halves 18, 20 are mounted on, and extend downwardly from, a frame 44 by means of support members 24, 26. The male mold half 18 is secured to support member 26 which is slidable along the frame 44. The female mold half 20 is secured to support member 24 which is fixed to the frame 44. Removable support beams 42 extend through suitable openings in the frame 44 to assist in lowering the tooling 16 into a fluidized bed 40. An air cylinder 34 is mounted on the support member 24 for moving the support member 26 and the male mold half 18 toward the female mold half 20. For this purpose, the cylinder 34 retracts a piston rod 32 which is attached to the movable support member 26. The movement of the member 26 is guided by rails 28, which are fixed relative to the frame 44, and bearings 30, which are received into aligned holes (not shown) in fixed support member 24.

FIG. 7 is a cross-sectional view illustrating the positioning and securing of a sheet 100 of honeycomb core material between the mold halves 18, 20. The core 100 is secured to the male mold half 18 by means of a bar 36, which extends vertically along the apex of the mold half 18, and two clamping pins 38 positioned at the top and bottom of the mold half 18, respectively. FIG. 6 shows the tooling 16 being lowered into a fluidized bed 40 with a flat sheet 100 of core positioned between the open mold halves 18, 20. When the tooling 16 has been lowered sufficiently to fully immerse the core 100, the tooling 16 is agitated slightly to ensure that the sand in the fluidized bed 40 flows freely between the mold halves 18, 20 through the holes 22 so that the entire core 100 is subjected to the fluidized heated sand. When the core 100 has been heated, the cylinder 34 is actuated to move the mold half 18 and form the core 100 in the bed 40. FIG. 8 is a cross-sectional view illustrating the positions of the mold halves 18, 20 and the configuration of the formed core 103 at the end of the procedure for forming the core by closing the mold halves 18, 20. Following the closing of the mold halves 18, 20, the tooling 16 is raised out of the bed 40 and shaken to remove the sand. The core 103 is then allowed to cool sufficiently to harden into its formed configuration before the mold halves 18, 20 are opened.

Forming honeycomb core material in accordance with the invention has been tested using the apparatus shown in FIGS. 5-8. These tests were highly successful in forming honeycomb core in a fluidized bed 40. The procedure followed is described above. The results were very rapid heat-up of the honeycomb core to its softened forming condition, and ready forming of the heated core. No damage to or contamination of the core was observed. The formed core acquired a permanent set without spring back. Post procedure cleaning requirements were minimal.

Various thicknesses and strengths of Nomex (trademark) honeycomb core were formed. Three to nine pound core with thicknesses of one-half inch to one and one-half inches was formed into small radius configurations with forming temperatures of 520°-620° F. Eight pound core with thicknesses of one inch, two inches, and four inches was successfully formed into 90° configurations at 400°-600° F. in 20° increments. A forming temperature of 600° F. was best.

In addition to the Nomex honeycomb core, twelve pound heat resistant plastic (HRP) honeycomb core was formed at the same temperatures as the eight pound Nomex core. The best forming temperature for this material was also 600° F. For the HRP, it was observed that cell node splitting occurred when the rate of forming was too high. The material was successfully formed without cell node splitting when it was heated quickly in the fluidized bed to relax the phenolic resin, and then slowly drawn to shape. The problem of splitting at higher rates of formation might have been a result of degradation of the cell node adhesive at the forming temperature. If so, use of a more heat resistant adhesive should completely eliminate the problem.

FIG. 9 illustrates five pieces of honeycomb core material 103 formed during the test procedure. As can be seen in FIG. 9, the high degree of consistency and accuracy in the forming of the honeycomb 103 allows it to be stacked in a neat nested configuration.

FIGS. 10-16 illustrate several preferred features of the invention and a preferred procedure for forming honeycomb core into configurations having small radii, such as the radii 60 shown in FIG. 15. FIG. 10 shows a flat piece of honeycomb core 104 which has been cut to a desired thickness from a stock block of core material and then cut to size and chamfered on a five-axis cutting machine. The chamfer 46 extends around the periphery of the core 104. Chamfering honeycomb core in this manner is a known technique of increasing the dimensional stability of the core. In accordance with a preferred feature of the invention, the core 104 has been cut into a size and shape that will result in a substantially final configuration when pressure is applied to form the core 104.

Another preferred feature of the invention is illustrated in FIGS. 10–12, 14, and 16. This feature includes the attaching of strips 48, 50, 52 of stiffening material to the unformed flat piece of core 104. The stiffening material may be of various types For example, supported or unsupported scrim is suitable. The preferred type of stiffening material is a film adhesive which includes a resin, such as an epoxy resin, and which becomes a permanent part of the finished component. The adhesive is applied to the core 104 in strips 48, 50, 52, as illustrated in FIGS. 10–12, 14, and 16. Preferably, a peel ply, which is removed later, is applied to the outer surfaces of the adhesive to protect it from contamination. Following application of the adhesive strips 48, 50, 52 with peel plies, the core 104 is vacuum bagged and cured at about 350° F. to cure the adhesive. The cured adhesive strips function to maintain the dimensional stability and indexing of the core 104 during later stages of the method.

The preferred arrangement of the strips 48, 50, 52 for a final configuration with two small radii 60 is best seen in FIGS. 10 and 12. Two strips 48 are positioned on the upper surface of the core 104, i.e. the smaller surface toward which the chamfer 46 tapers. These strips 48 are spaced from each other and from the parallel sides of the chamfer 46 and extend to and between the perpendicular chamfer edges, as shown in FIGS. 10 and 12. The strips 50, 52 are attached to the opposite lower surface of the core 104. The strips 50, 52 are positioned so that, for each upper strip 48, there are two spaced lower strips 50, 52 that overlap opposite edge portions of the upper strip 48. The larger lower strips 50 have generally C-shaped configurations while the smaller strips 52 take the form of small, almost square, rectangles. The overlap portions 62 of the strips 48, 50, 52 are corner portions which are adjacent to the chamfer 46 and which especially need reinforcing to maintain dimensional stability during forming of the core 104. The larger lower strips 50 also cover the major portion of the lower surface of the chamfer to reinforce the stabilizing effect of the chamfer 46.

Another preferred feature of the invention is illustrated in FIG. 14. This is the indexing and securing of the core body 104 onto a mold 56 prior to immersing the body 104 into the fluidized bed or other heated fluid. In order to readily accomplish this, indexing tabs 54 are attached to the core body 104. The body 104 is located on a template (not shown), and locating holes 55 are drilled in the tabs 54 to correspond to the indexing pins 58 on the mold 56, best seen in FIG. 13. The tabs 54 and indexing pins 58 are preferably positioned in part excess so that they may be removed following the forming of the core 104 into its final three-dimensional configuration 105, shown in FIG. 15. The attaching of the tabs 54 may include a potting or ply build-up operation to stiffen the tabs 54.

FIG. 14 shows the prepared core 104 attached to the mold 56 by means of the indexing tabs 54 and pins 58. The tabs 54 are secured to the pins 58 by known fastening means. The thickness of the adhesive strips 50, 52 is greatly exaggerated in FIG. 14 for the purpose of illustration. In actual practice, the core body 104 would lie essentially flat against the top of the mold 56. The core 104 is positioned so that, when pressure is applied, the core 104 will bend along each of the upper strips 48, to form an outer radius along the strip 48 and an inner radius between the corresponding spaced lower strips 50, 52. FIG. 15 shows the final formed configuration 105 of the core. The radii are indicated by the reference numeral 60. FIG. 16 illustrates the relationship between the stiffening strips 48, 50, and 52 and the radii 60 in the final configuration 105. The strip 48 extends along the outer radius. The strips 50, 52 extend away from the edges of the inner radius.

The areas of overlap 62 are stiffened by the strips 48, 50, 52 to prevent deformation in the area adjacent to the radius 60. Since the cured film adhesive does not stretch, the arc length along the outer radius is maintained constant to maintain the dimensional stability of the outer surface of the core on which the strips 48 are positioned. The uniformity of thickness of the core body is maintained throughout the radius 60 and adjacent areas. Since the dimensioning of the outer surface and the thickness are reliably maintained throughout the forming operation, the indexing on the mold 56 and the precut dimensioning are also reliably maintained. Thus, the dimensions of the precut flat core 104 may be chosen so that, when the formed core 105 is removed from the mold 56 following the application of pressure, final finishing procedures are minimal. In most cases, all that is required is to remove the peel plies from the strips 48, 50, 52 and clean the formed core 105. The face sheets or skins of the finished honeycomb core component would normally be bonded to the formed core 105 after the core forming procedure is completed.

The forming of the flat core 104 into the final configuration 105 is accomplished by immersing the mold 56 with the attached core 104 into a heated fluid, preferably a fluidized bed. Then pressure is applied to form the secured body 104 against the mold 56. This is preferably done after the mold 56 and secured body 104 have been removed from the fluid. The preferred procedure for applying pressure is illustrated in FIGS. 17–19.

Referring to FIGS. 17–19, the illustrated procedure is suitable for forming bodies 100 of honeycomb core material as well as bodies of other types of material. Prior to the illustrated pressure application procedure, the material may be precut, indexed and secured, and/or stiffened, as appropriate. With specific reference to FIGS. 17–19, a flat piece of honeycomb core 100 is positioned between a mold or forming tool 74 and a flexible membrane 68. The membrane 68 is mounted on a box 66 of any suitable material. The membrane 68 may comprise, for example, an elastomeric material, nylon, Nomex, Kevlar (trademark), or possibly canvas. The edges of the membrane 68 are sealed around an open side of the box 66. The other sides of the box 66 are enclosed to create a sealed pressure chamber inside the box 66. An air line 72 communicates with the chamber. The membrane 68 loosely covers and seals the open side of the box 66, i.e. there is sufficient extra membrane material so that the core 100 may be formed without stretching the membrane 68. The box 66 keeps tension off the membrane 68. The workpiece-engaging portion of the tool 74 is perforated to allow a vacuum to be applied through the tool 74 via a vacuum line 76.

FIGS. 17 and 18 illustrate the positioning of the heated core 100 between the tool 74 and membrane 68 prior to the application of pressure. The core 100 may be positioned separately from the tool 74, as shown, or may be indexed and secured to the tool 74 in the manner illustrated in FIG. 14. The tool 74 and the membrane-supporting box 66 may be oriented horizontally, as shown, vertically, or at an angle. The box 66 and tool 74 are moved relatively toward each other to urge the core 100 against the mold surface of the tool 74. As the tool 74 and box 66 move together, the tool 74 enters the box 66 to form the core 100 between the tool 74 and the membrane 68. Preferably, the tool cross section is substantially equal to the size of the opening in the box 66, with just enough room to accommodate the core 100 and the membrane 68. This dimensioning helps to support the membrane 68 and form the core 100. After the tool 74 has partially or fully penetrated the box 66, the box is pressurized through the air line 72 to a pressure of 1-15 pounds per square inch. Preferably, a vacuum is also applied through the vacuum line 76. The combination of the pressure inside the box 66 and the vacuum through the tool 74 assists the membrane in the accurate forming of the core 100. FIG. 19 illustrates the end of the pressure applying procedure when the tool 74 has fully penetrated the box 66 and the final configuration 106 of the core has been attained.

FIGS. 20-22 illustrate another procedure for forming a piece of honeycomb core 100 into the configuration 106 following removal of the heated core 100 from the fluidized bed or heated bath. The apparatus for carrying out this procedure includes a vessel 78 filled with a fluid, such as water or a molten alloy. In the case of a molten alloy, the temperature of the fluid is hot enough to melt the alloy but lower than the temperature of the fluidized bed or heated bath. In the case of water, the temperature is room temperature. An elastomeric membrane 80 has edge portions attached to the sidewalls of the vessel 78 and lies on the surface of the fluid. Like the membrane in FIGS. 17-19, the membrane 80 is loosely positioned so that the core 100 may be formed without stretching the membrane 80. The core 100 is formed by a tool 82 that urges it against the membrane 80. Preferably, the core 100 is indexed and secured to the tool 82 prior to the application of pressure, as indicated schematically in FIG. 20. FIG. 21 illustrates the procedure as the tool 82 begins to push down on the membrane 80 and displace the fluid. FIG. 22 illustrates the end of the pressure applying procedure in which the tool 82 and core are fully surrounded by the membrane 80 and the uniform pressure of the fluid on the membrane 80 has formed the core around the tool 82 into its final configuration 106.

Figure 23:
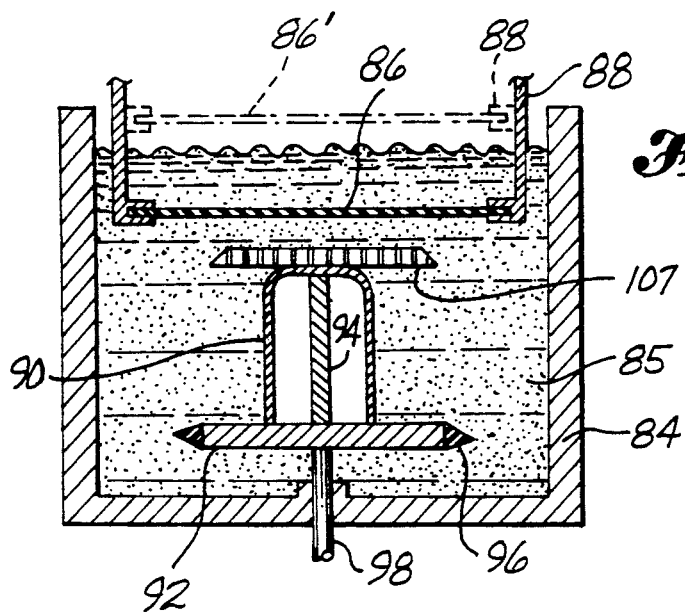
FIG. 23 is a vertical sectional view of apparatus for immersing and forming honeycomb core in accordance with the invention, with alternative positions of the forming membrane shown in solid and broken lines, respectively.
Figure 24:
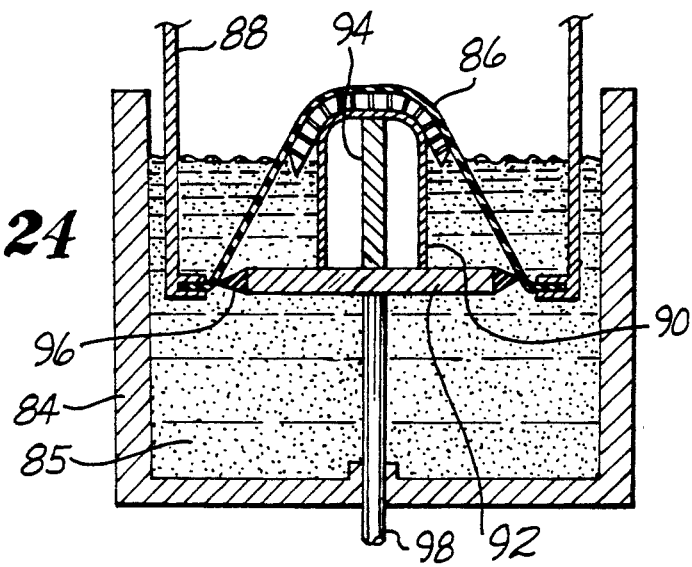
FIGS. 24 and 25 are vertical sectional views illustrating intermediate and final stages of the forming operation, respectively, using the apparatus shown in FIG. 23.
Figure 25:
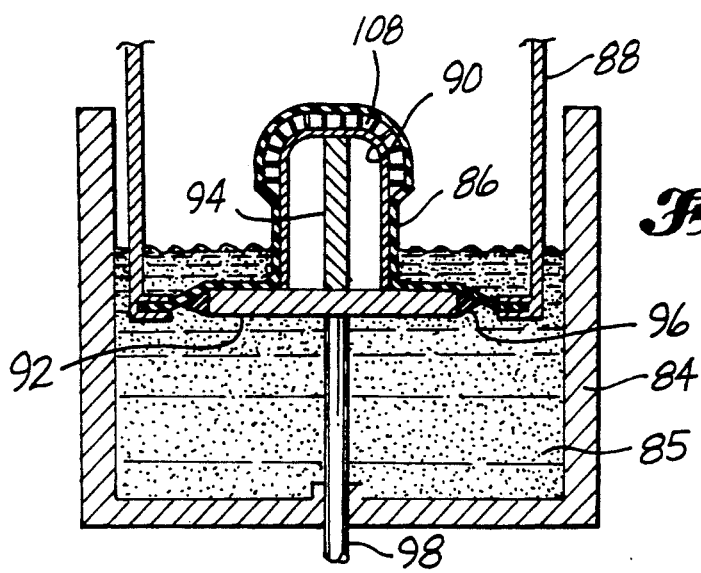

FIGS. 23-25 illustrate a pressure applying procedure for forming a beveled flat piece of honeycomb core 107 either as and after the core 107 is removed from a fluidized bed 84 or following removal of the core 107 from the bed 84. The forming of the core 107 is accomplished by urging it between a stretchable membrane 86, 86' and a perforated tool 90 through which a vacuum is applied. The membrane 86, 86' may be made from either a thermoplastic material 86 or an elastomeric material 86'. The position of the thermoplastic membrane 86 is shown in solid lines in each of FIGS. 22-25. It is positioned below the level of the sand 85 in the fluidized bed 84 to heat it to soften it into a stretchable condition. The position of the elastomeric membrane 86' is shown in broken lines in FIG. 23. It is positioned above the sand level to prevent damage to the elastomeric material by exposure to the temperature of the fluidized sand 85. In each case the membrane 86, 86' is supported on a vertically movable frame 88. The tool 90 is supported by a base 92 and a vertical rib 94. A pyramid-type seal 96 extends around the periphery of the base 92 and engages the membrane 86 to allow the space between the membrane 86 and the tool 90 to be evacuated through the perforated tool 90.

In the pressure applying procedure, the tool 90 and membrane 86 are moved relatively toward each other to form the core 107 therebetween. Preferably, this is accomplished by moving the tool 90 upwardly toward the membrane 86. An example of a mechanism for accomplishing movement of the tool 90 is shown in FIGS. 23-25. A piston rod 98 is attached to the base 92 and moves upwardly to thereby move the tool 90 and base 92 upwardly toward the membrane 86. FIG. 23 illustrates the initial stage of the procedure before the core 107 comes into contact with the membrane 86. FIG. 24 illustrates an intermediate stage of the procedure in which the core has come into contact with the membrane 86 and the seal 96 has engaged the membrane 86. The stretching of the membrane 86 has begun the forming of the core. At this stage, a vacuum is applied through the perforated tool 90 via a vacuum line that extends through the piston rod 98 into the interior of the tool 90. The vacuum evacuates the sand 85 in the space between the tool 90 and the membrane 86 as well as the gas associated with the sand that has been injected into a lower portion of the fluidized bed 84 to fluidize the sand 85 in a known manner. The vacuum line includes a sand trap and the sand remains sufficiently fluidized to avoid clogging of the vacuum line by sand. FIG. 25 illustrates the end of the forming procedure in which the space between the membrane 86 and tool 90 has been fully evacuated and the core has been fully formed into its final configuration 108. When the core 108 has cooled sufficiently to retain its configuration, the vacuum may be released and the core 108 removed.

FIGS. 26-29 illustrate pressure applying devices that are alternatives to the types of membranes shown in FIGS. 17-25. Use of these devices is within the scope of the invention. However, to date, the use of a flexible membrane is preferred.

FIGS. 26 and 27 illustrate a flexible chain mat 122 that is designed for forming honeycomb core within a fluidized bed 120. The mat 122 includes a plurality of cross-linked chain members, which may be formed by metal balls, split links, or twisted solid wire. The mat 122 is mounted on a vertically movable frame 124. In the practice of the invention using the chain mat apparatus, the core material 100 to be formed is preferably indexed and secured to a tool 126 supported on a base 128. The positioning of the tool is illustrated in FIG. 26, which also shows the initial position and configuration of the honeycomb core 100 in broken lines. When the core 100 has been sufficiently softened by exposure to the heated fluidized bed, the chain mat 122 is lowered to mold the core 100 around the tool 126. FIG. 26 illustrates in broken lines the position of the mat 122 as it begins to come into contact with the heated core 100. The final position of the mat 122, when the core has been molded into its final configuration 109, is shown in solid lines in FIG. 26. Preferably, means (not shown) is provided for raising the tool 126 with the chain mat 122 to remove the formed core 109 from the fluidized bed 120 and allow it to set before the pressure is removed. The raising means could also be used instead of or in conjunction with the means for lowering the frame 124 to mold the core against the tool 126.

FIG. 28 illustrates an alternative form of a flexible chain pressure applying device 130. In this device 130, a multiplicity of separate vertical strings of chain elements 131 are suspended from a frame 132. The elements 131 may take the various forms discussed above in connection with the chain mat 122. The device 130 is preferably used in the same manner as the chain mat 122.

FIG. 29 illustrates a third alternative form of flexible pressure applying device. The device is a sewn quilted Nomex bag 134 filled with steel shot. The bag 134 has flat edges 136 provided with holes 138 for mounting it on a frame of the type shown in FIG. 27. In most cases, this type of bag 134 must be used for applying pressure after the heated body of material is removed from the fluid since the intense heat of the fluid tends to damage the bag 134.

FIGS. 30-32 illustrate another embodiment of apparatus for immersing and forming a body of material. This apparatus was conceived as an alternative to the apparatus shown in FIGS. 5-8. However, to date, the apparatus of FIGS. 30-32 has proven less satisfactory because of a tendency of the material of the bladder 146 to degrade and rupture. It may be possible to eliminate this problem by use of more heat resistant bladder materials.

Referring to FIGS. 30-32, the apparatus includes a frame 140 in which a perforated male mold 142 is mounted. As much of the frame structure as possible is open in order to allow free flow of fluidized sand into and out of the frame 140. Vertically spaced horizontal stiffeners 144 are positioned inside the mold 142 to reinforce the mold 142. The bladder 146 is attached around its periphery to a bladder support 148 positioned on an inner surface of the frame 140. FIGS. 31 and 32 illustrate the forming procedure using the apparatus of FIG. 30. A piece 100 of core material is positioned between the mold 142 and the membrane 146. Although the core 100 is shown in FIG. 31 separate from the mold 142, it may be indexed and secured in the manner discussed above. When the core 100 has been positioned, the frame 140 is lowered into a fluidized bed to heat the core 100 and thereby soften it. Then, the bladder 146 is inflated to urge the core against the mold 142 and form it between the mold 142 and the bladder 146. FIG. 32 illustrates the even application of pressure by the bladder 146 and the final configuration 110 of the core. After the core has been formed, the frame 140 is raised out of the fluidized bed and the formed core 110 is allowed to cool.

FIG. 33 illustrates an embodiment of pressure applying apparatus by means of which the pressure may be applied by hand. The apparatus includes a flexible stainless steel wire screen 154 having opposite edge portions attached to a pair of handles 156. Steel coil springs may also be used instead of the screen 154. In the use of the apparatus, the handles 156 are grasped by an operator to urge the screen 154 against a heated piece of honeycomb core 100 to thereby urge the core 100 against a mold 150 mounted on a base 152. Preliminary tests indicate that this type of hand forming apparatus must be used after the heated core 100 has been removed from the fluid. Attempts to use such apparatus while the core 100 is still in the heating fluid has presented a number of problems. The problems include attaining uniform pressure on the core and removing the core with the screen 154 and mold 150 following the application of pressure.

FIG. 34 is a schematic representation of apparatus for forming large scale sheet material in accordance with the invention. Such material might include, for example, a laminated sheet of plastic, such as a consolidated lay-up of fiber reinforced resin matrix composite material. The workpiece material may also comprise reinforced or nonreinforced thermoplastic sheet stock, a sheet of titanium, or other semirigid sheet material. The thickness of the material may be uniform or nonuniform.

Referring to FIG. 34, a vertically oriented fluidized bed 162 is mounted to extend downwardly into a building substructure or the ground. The upper portion of the bed 162 is open and extends into a working area. A large scale mold 160 is positioned in a horizontal orientation next to the open top of the fluidized bed 162. The unformed flat workpiece 170 is connected around its periphery to a frame 168. The frame 168 is supported by and attached to a support framework 164 by means of pivot connections 166. After the unformed workpiece 170 is attached to the frame 168, it is pivoted into a vertical orientation and lowered into the fluidized bed 162. When the workpiece 170 has been heated to its softened condition, it is raised out of the bed 162 and moved into a horizontal orientation over the mold 160. The heated workpiece 170 is then released from the frame 168 and formed against the upper mold surface 160.

The procedure for forming the workpiece 170 against the mold 160 is substanially the same as a procedure that is currently widely used in the aerospace and automobile industries to form relatively small scale sheet stock. The workpiece 170 is formed by means of a vacuum applied through openings in the upper mold surface 160 to pull the workpiece 170 into intimate contact with the mold surface 160. In the case of some materials, such as titanium, very high vacuum pressure may be required, and there may be a need for additional pressure from above applied, for example, by a back-up diaphragm. The method of the invention, as illustrated in FIG. 34, makes it possible to readily form large scale components, such as large wing sections or even whole wings. The entire immersing and forming operation may be controlled by a single operator at a control console 172 to help maximize the efficiency of the operation.

FIGS. 35 and 36 illustrate the forming of an end portion of a section of thermoplastic ducting 176. The end portion of the ducting 176 is first immersed in a fluidized bed or other heating fluid by grasping the ducting 176 and dipping its end into the heated fluid. Then the end of the ducting 176 is removed from the heated fluid and pushed onto a mandrel 178, as illustrated in FIGS. 35 and 36. The end of the ducting 176 which has been immersed forms a softened zone 180. When the ducting 176 is pushed all the way onto the mandrel into the position shown in FIG. 36, the softened zone 180 is formed into the flared configuration shown in FIG. 36. The ducting 176 is then allowed to cool, after which it is removed from the mandrel 178.

FIGS. 37-40 illustrate in partially schematic form another embodiment of forming apparatus. The apparatus includes an upper member 182 and a lower member 184. Each member 182, 184 includes a rectangular frame 186 for mounting a plurality of parallel forming plates 188, 190. The plates 188 of the upper member project downwardly from the upper frame 186. The plates 190 of the lower member project upwardly from the lower frame 186 and are oriented perpendicularly to the upper plates 188. In upper member 182, each plate 188 has a constant vertical extent, and the vertical extent varies from plate 188 to plate 188 so that the outer edges of the plates 188 conform to a desired contour.

The outer edge of each lower plate 190 forms a complementary contour. The plates 188, 190 shown in FIGS. 37-40 are relatively far apart to facilitate illustration. In actual practice, the plates 188, 190 would generally be closer together so that their outer edges would form a more accurate contour. The plates 188, 190 may be provided with supporting structure (not shown) extending between adjacent parallel plates in the upper and/or lower member 182, 184 to give the tooling 182, 184 more rigidity and maintain the contour formed by the plates 188, 190.

FIG. 37 shows the upper member 182 and lower member 184 in an open position with the two sets of forming plates 188, 190 spaced from each other. FIG. 38 shows the members 182, 184 in their open position with a piece of unformed honeycomb 100 positioned therebetween ready for forming. FIG. 39 shows the members 182, 184 in a closed position at the end of a forming operation with a formed piece of honeycomb 112 between the two sets of plates 188, 190. FIG. 40 illustrates the forming apparatus 182, 184 in an open position to release the formed honeycomb 112.

Figure 41:
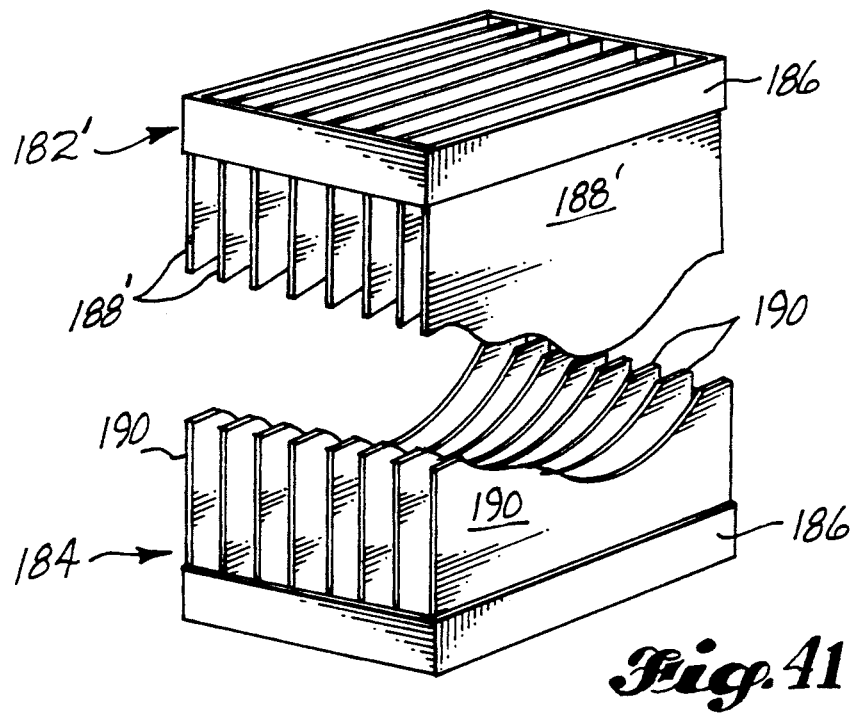
FIG. 41 is a pictorial view of a variation of the forming apparatus shown in FIGS. 37–40.

FIG. 41 is a pictorial view similar to FIG. 37 showing a modified form of the forming apparatus shown in FIGS. 37-40. The modified apparatus has an upper member 182' and a lower member 184 each of which includes a rectangular frame 186. The plates 190 of the lower member 184 are oriented in the same manner as the plates 190 shown in FIGS. 37-40. However, the upper plates 188', rather than being perpendicular to the plates 190, are parallel to the plates 190, and each of the upper plates 188' has a contoured outer edge that complements the contoured outer edge of the corresponding lower plate 190. Apparatus of the general type shown in FIGS. 37-41 has previously been used in stamping or pressing operations to form metallic honeycomb.

The method of the invention may be practiced using the apparatus shown in FIGS. 37-41 in various ways. Preferably, the upper member 182, 182' is mounted on rails which engage the upper frame 186 at its corners and which extend down into the bed or bath of heated fluid. The lower member 184 may also be mounted on the rails or may be mounted in a lower portion of the bed or bath. An actuator is provided to move the upper member 182 downwardly along the rails into the bed or bath to urge a piece of honeycomb to be formed against the lower plates 190. Preferably, the honeycomb is indexed to either the upper or lower member 182, 182', 184. Alternatively, the unformed honeycomb 100 may be simply positioned between the members 182, 182', 184 without indexing. In this case, the formed core will require trimming following the forming operation. The provision of spaced apart parallel plates 188, 188', 190, rather than more continuous tooling surfaces, facilitates carrying out the method of the invention. The spaces between the plates 188, 188', 190 provide pathways for fluidized sand or molten fluid to flow freely through the tooling 182, 182', 184 to expose substantially all parts of the honeycomb being formed to the heated fluid throughout the forming operation.

It will be obvious to those skilled in the art to which this invention is addressed that the invention may be used to advantage in a variety of situations and to form a variety of types of material. Therefore, it is also to be understood by those skilled in the art that various modifications and omissions in form and detail may be made without departing from the spirit and scope of the invention as defined by the following claims.

What is claimed is:

1. A method of changing the three-dimensional configuration of a substantially rigid body of material, comprising:

heating a fluid to a temperature sufficiently high to soften said material and sufficiently low to avoid damage to said material;

while maintaining said fluid at said temperature, immersing said body in said fluid to heat said body uniformly;

applying pressure to the heated body to form it into a desired three-dimensional configuration;

removing the heated body from said fluid; and allowing said body to cool and harden into said desired configuration.

2. The method of claim 1, in which said fluid comprises a fluidized bed.

3. The method of claim 1, in which said fluid comprises a molten bath.

4. The method of claim 1, in which the step of applying pressure is carried out following removal of the heated body from said fluid.

5. A method of changing the three-dimensional configuration of a substantially rigid body of material, comprising:

heating a fluid to a temperature sufficiently high to soften said material and sufficiently low to avoid damage to said material;

while maintaining said fluid at said temperature, immersing said body in said fluid to heat said body uniformly, while said body is immersed in said fluid, applying pressure to the heated body to form it into a desired three-dimensional configuration;

removing the heated body from said fluid; and allowing said body to cool and harden into said desired configuration.

6. The method of claim 5, in which the step of applying pressure comprises moving a flexible member and a mold surface relative to each other to urge said body against said mold surface.

7. A method of changing the three-dimensional configuration of a substantially rigid body of material, comprising:

heating a fluid to a temperature sufficiently high to soften said material and sufficiently low to avoid damage to said material;

while maintaining said fluid at said temperature, immersing said body in said fluid to heat said body uniformly;

applying pressure to the heated body to form it into a desired three-dimensional configuration;

removing the heated body from said fluid; and allowing said body to cool and harden into said desired configuration;

in which said material comprises titanium and has a melting point, and said temperature is less than said melting point.

8. The method of claim 1, in which said body comprises plastic tubing.

9. A method of changing the three-dimensional configuration of a substantially rigid body of material, comprising:

heating a fluid to a temperature sufficiently high to soften said material and sufficiently low to avoid damage to said material;

while maintaining said fluid at said temperature, immersing said body in said fluid to heat said body uniformly;

applying pressure to the heated body to form it into a desired three-dimensional configuration;

removing the heated body from said fluid; and allowing said body to cool and harden into said desired configuration;

in which said body comprises a laminated sheet of plastic.

10. A method of changing the three-dimensional configuration of a substantially rigid body of material, comprising:

heating a fluid to a temperature sufficiently high to soften said material and sufficiently low to avoid damage to said material;

while maintaining said fluid at said temperature, immersing said body in said fluid to heat said body uniformly;

applying pressure to the heated body to form it into a desired three-dimensional configuration;

removing the heated body from said fluid; and allowing said body to cool and harden into said desired configuration;

in which said body comprises a honeycomb structure.

11. The method of claim 10, which further comprises, before immersing said body, indexing and securing said body on a mold; and in which the step of immersing includes immersing said mold and the secured body, and the step of applying pressure includes forming the secured body against said mold.

12. The method of claim 11, in which said body is formed against said mold by moving said mold and a flexible member relative to each other.

13. The method of claim 12, comprising removing said mold and the secured body from said fluid before forming said body against said mold.

14. The method of claim 11, in which said method comprises producing a honeycomb part with final configuration; and which further comprises, before indexing and securing said body, cutting said honeycomb structure into a shape that will result substantially in said final configuration when said pressure is applied to minimize final finishing procedures.

15. The method of claim 14, in which the step of cutting includes chamfering edge portions of said honeycomb structure.

16. The method of claim 11, which further comprises, before immersing said body, attaching a first strip of stiffening material to a first surface of said honeycomb structure, and attaching two spaced strips of stiffening material to a second surface of said structure opposite said first surface, including positioning said spaced strips to overlap opposite edge portions of said first strip; and in which the step of applying pressure comprises applying pressure to bend said structure along said first strip, to form an outer radius along said first strip and an inner radius between said spaced strips.

17. The method of claim 16, in which said stiffening material comprises film adhesive.

18. The method of claim 16, in which said body is formed against said mold by moving said mold and a flexible member relative to each other.

19. The method of claim 18, comprising removing said mold and the secured body from said fluid before forming said body against said mold.

20. The method of claim 16, in which said method comprises producing a honeycomb part with a final configuration; and which further comprises, before indexing and securing said body, cutting said honeycomb structure into a shape that will result substantially in said final configuration when said pressure is applied, to minimize final finishing procedures.

21. The method of claim 10, which further comprises, before immersing said body, attaching a first strip of stiffening material to a first surface of said honeycomb structure, and attaching two spaced strips of stiffening material to a second surface of said structure opposite said first surface, including positioning said spaced strips to overlap opposite edge portions of said first strip; and in which the step of applying pressure comprises applying pressure to bend said structure along said first strip, to form an outer radius along said first strip and an inner radius between said spaced strips.

22. The method of claim 21, in which said method comprises producing a honeycomb part with a final configuration; and which further comprises, before immersing said body, cutting said honeycomb structure into a shape that will result substantially in said final configuration when said pressure is applied, to minimize final finishing procedures.

23. The method of claim 10, in which said method comprises producing a honeycomb part with a final configuration; and which further comprises, before immersing said body, cutting said honeycomb structure into a shape that will result substantially in said final configuration when said pressure is applied, to minimize final finishing procedures.

24. A method of changing the three-dimensional configuration of a substantially rigid body of material, comprising:

heating a fluid to a temperature sufficiently high to soften said material and sufficiently low to avoid damage to said material;

while maintaining said fluid at said temperature, immersing said body in said fluid to heat said body uniformly;

applying pressure to the heated body to form it into a desired three-dimensional configuration;

removing the heated body from said fluid; and allowing said body to cool and harden into said desired configuration;

which further comprises, before immersing said body, indexing and securing said body on a mold; and in which the step of immersing includes immersing said mold and the secured body, and the step of applying pressure includes forming the secured body against said mold.

25. The method of claim 24, in which said body is formed against said mold by moving said mold and a flexible member relative to each other.

26. The method of claim 25, comprising removing said mold and the secured body from said fluid before forming said body against said mold.

27. The method of claim 24, in which the step of applying pressure is carried out while said body is immersed in said fluid.

* * * * *

UNITED STATES PATENT AND TRADEMARK OFFICE
CERTIFICATE OF CORRECTION

PATENT NO. : 5,119,535
DATED : June 9, 1992
INVENTOR(S) : Clayton C. Gnagy, William L. Rodman, and Ralph R. Welsh It is certified that error appears in the above-identified patent and that said Letters Patent is hereby corrected as shown below:

Abstract, first line, insert -- , -- following "fluid".
Column 1, line 62, there is a period after "heating".
Column 2, line 3, there is a period after "sections".
Column 2, line 18, there is a period after "cracking".
Column 3, lines 26 and 27, after "materials", insert -- in --.
Column 3, line 67, there is a period after "mediums".
Column 4, line 4, ".fluid" should be -- fluid --.
Column 6, line 58, there is a period after "together".
Column 10, line 25, there is a period after "observed".
Column 11, line 42, after "chamfer", insert -- 46 --.
Claim 14, column 19, second line of claim, after "with",
    insert -- a --.

Signed and Sealed this

Fifth Day of October, 1993

*Attest:*

BRUCE LEHMAN

*Attesting Officer*         Commissioner of Patents and Trademarks